(12) United States Patent
Qiu et al.

(10) Patent No.: US 8,077,983 B2
(45) Date of Patent: Dec. 13, 2011

(54) SYSTEMS AND METHODS FOR CHARACTER CORRECTION IN COMMUNICATION DEVICES

(75) Inventors: Weigen Qiu, Alberta (CA); Samuel Yin Lun Pun, Alberta (CA)

(73) Assignee: Zi Corporation of Canada, Inc., Alberta (CA)

( * ) Notice: Subject to any disclaimer, the term of this patent is extended or adjusted under 35 U.S.C. 154(b) by 952 days.

(21) Appl. No.: 11/867,684

(22) Filed: Oct. 4, 2007

(65) Prior Publication Data

US 2009/0092323 A1    Apr. 9, 2009

(51) Int. Cl.
 G06K 9/72  (2006.01)
 G06K 9/03  (2006.01)
(52) U.S. Cl. .................... 382/229; 382/311; 715/256
(58) Field of Classification Search .............. 382/229, 382/231, 309, 310, 311; 715/256, 257
See application file for complete search history.

(56) References Cited

U.S. PATENT DOCUMENTS

| | | | |
|---|---|---|---|
| 5,774,588 A * | 6/1998 | Li ................................. | 382/230 |
| 6,286,064 B1 | 9/2001 | King et al. | |
| 6,556,841 B2 | 4/2003 | Yu | |
| 7,254,773 B2 | 8/2007 | Bates et al. | |
| 2002/0021838 A1* | 2/2002 | Richardson et al. ........ | 382/181 |
| 2002/0188448 A1* | 12/2002 | Goodman et al. ........... | 704/254 |
| 2005/0174333 A1 | 8/2005 | Robinson et al. | |
| 2006/0028450 A1 | 2/2006 | Suraqui | |
| 2008/0189605 A1 | 8/2008 | Kay et al. | |

FOREIGN PATENT DOCUMENTS

CA    2533328    9/2006

OTHER PUBLICATIONS

Supplementary European Search Report mailed Jan. 20, 2011 in related European Patent Application No. EP08807230, 7 pages.
International Search Report mailed Feb. 25, 2009 in related PCT patent application No. PCT/IB2008/002737, 14 pages.

* cited by examiner

Primary Examiner — Jon Chang
(74) Attorney, Agent, or Firm — Michael A. Glenn; Glenn Patent Group

(57) ABSTRACT

A system and method for character error correction is provided, useful for a user of mobile appliances to produce written text with reduced errors. The system includes an interface, a word prediction engine, a statistical engine, an editing distance calculator, and a selector. A string of characters, known as the inputted word, may be entered into the mobile device via the interface. The word prediction engine may then generate word candidates similar to the inputted word using fuzzy logic and user preferences generated from past user behavior. The statistical engine may then generate variable error costs determined by the probability of erroneously inputting any given character. The editing distance calculator may then determine the editing distance between the inputted word and each of the word candidates by grid comparison using the variable error costs. The selector may choose one or more preferred candidates from the word candidates using the editing distances.

18 Claims, 21 Drawing Sheets

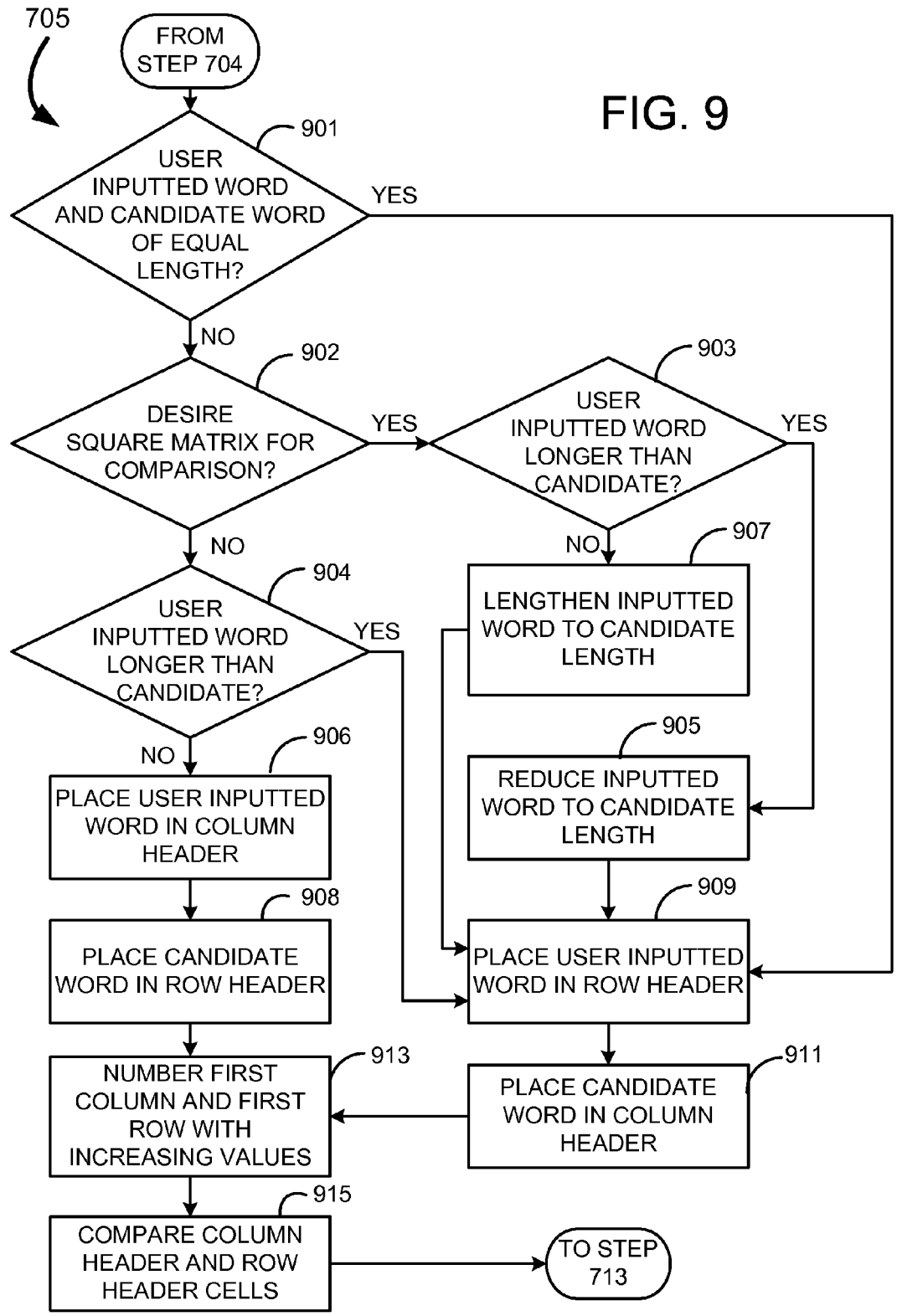

SYSTEMS AND METHODS FOR CHARACTER CORRECTION IN COMMUNICATION DEVICES

BACKGROUND OF THE INVENTION

This invention relates generally to character correction systems and methods to provide fast and efficient correction of inputted characters. More particularly, the present invention relates to a method for predicting and correcting for character errors on error prone input devices with limited keypads. Characters may include text using Roman based alphabets, Chinese alphabet, Arabic scripts, or virtually any known language's symbology.

In today's increasingly mobile population, the ability to input text into a mobile device is becoming more desirable. Emails, appointments and text messages are routinely inputted into mobile devices, including Personal Digital Assistants (PDA's), cell phones and computerized organizers.

For the business person, the ability to send emails and document appointments, while on the go, enables a jumpstart into the workday, increased productivity and enhanced flexibility. For the teenager, or other casual user, text messaging has become an exceedingly common phenomena and a form of social currency. However, the small, highly portable size of the devices that enable mobile text connectivity also render the text highly error prone due to small, and often ambiguous, keypads for the inputting of text.

Text errors in casual text conversations may be tolerated in some instances; however, when the message is sensitive as to content or recipient, errors may have disastrous effects. As such, there is a strong felt need for text error correction.

This need for text error correction has been evident since the development of word processing. In response, spell check programs have evolved to address the need for error free text. Current text correction, however, requires a lot of resources in terms of processor, power and storage requirements. Moreover, the current text correction may not specifically address the unique problems commonly incurred by authors using mobile devices. These current methods are not particularly efficient and rely upon the availability of free processor resources to check each word, one at a time, against comparables in a dictionary stored in memory. In simple applications, the spell checking activity may be deferred until invoked by the user. In more sophisticated schemes, provided that the activity does not detract from the system response time, words may be evaluated as soon as they can be distinguished, for example as soon as a delimiting character is detected following a word. Similarly, where a character sequence does not match any word in the stored dictionary, it may be possible to compare to near alternatives where one or more characters differ. Simple errors such as capitalization can sometimes be corrected "on the fly" but in technical material, automated correction rapidly becomes infuriating.

Additionally, current text correction often is unable to discern intended text from correctly spelled but erroneous text. Efforts at contextual recognition are still relatively primitive and suffer from "cultural corruption" wherein seemingly identical languages such as British English and American English use quite diverse and sometimes disparate meanings. For example the word "bomb" when used to describe an event may relate to being very good in the British English form yet be indicative of failure in the American English form.

Mobile devices typically have fewer processing, power and storage resources available than a stationary computer system. Additionally, due to specific geometries of input keypads, necessitated by the devices' small design, error types and frequencies may be statistically skewed.

Thus, in the typical mobile device, the current text correction technologies may be inadequate as requiring too much processing or storage resources, while providing inaccurate text correction. Manufacturers and retailers of mobile devices would benefit greatly from the ability to offer devices with accurate and resource efficient text correction. Additionally, users of these mobile devices would benefit greatly by having a reduced frequency of text errors.

It is therefore apparent that an urgent need exists for an improved system and method for character error correction that is both accurate and efficient. This solution would replace current character error correction techniques with a more accurate system with regards to mobile devices and reduced resource demands; thereby increasing effectiveness of error reduction in text input performed on a mobile device.

SUMMARY OF THE INVENTION

To achieve the foregoing and in accordance with the present invention, a method and system for character error correction is provided. Such a system is useful for a user of mobile devises to produce accurate and reduced error compilations. Such a reduction in text errors may be helpful in cases of sensitive content of the text, or when the recipient of said text is sensitive to errors.

One advantage of the present invention is that a reduction in processing, power and storage resources may be achieved over traditional methods for character error correction. Additionally, by specifically addressing the errors common to inputs made on small keypads, the present invention may provide more accurate character, syllable or symbol correction. Henceforth, the term character is used inclusively of alphabetic symbols as well as syllabic symbols and also ideographic symbols to support the operation of this technology across all languages.

The character error corrector is useful for use with a mobile device, such as a cell phone, PDA or similar device. The error corrector may include an interface, a word prediction engine, a statistical engine, an editing distance calculator, and a selector for selecting the best word matches to correct the character error. These word matches may be referred to as candidate words and may include all or part of a word as in the case of a prefix.

A string of characters, known as the inputted word, may be entered into the mobile device via the interface. The word prediction engine may then generate word candidates similar to the inputted word using fuzzy logic. Likewise, the candidates may be selected using user preferences generated from past user behavior.

The statistical engine may then generate variable error costs. These error costs may be determined by the probability of erroneously inputting any given character of the string of characters while using the error prone keypads of the mobile devices. These variable error costs may include replacement error costs, addition error costs and deletion error costs.

The editing distance calculator may then determine the editing distance between the inputted word and each of the word candidates. The editing distance calculation may use the variable error costs. The editing distance is the degree of attenuation between the word candidate and the inputted character string, and a grid comparison between each word candidate and the inputted word may be used to calculate these editing distances.

Also, previously performed editing distance calculations may be inputted into subsequent editing distance calculations when some of the character strings are common, thereby reducing processor and power demands. Moreover the editing distance calculation may be performed along grid rows during the grid comparison, enabling previous rows to be purged from memory, thereby reducing storage demands.

Lastly the selector may choose one or more preferred candidates from the word candidates. Typically the preferred candidates are those having the smallest editing distance of all the word candidates. Alternatively, all candidates with editing distances below a threshold may be chosen as preferred candidates.

These and other features of the present invention may be practiced alone or in any reasonable combination and will be discussed in more detail below in the detailed description of the invention and in conjunction with the following figures.

BRIEF DESCRIPTION OF THE DRAWINGS

In order that the present invention may be more clearly ascertained, one embodiment will now be described, by way of example, with reference to the accompanying drawings, in which:

FIG. 9 shows a flow chart illustrating a process of grid comparison between the inputted string and candidate string in accordance with an embodiment of the present invention;

DETAILED DESCRIPTION OF THE INVENTION

I. Introduction

The present invention will now be described in detail with reference to several embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

The present invention relates generally to text correction systems and methods to provide fast and efficient text correction for mobile devices. More particularly, the present invention relates to a method for text error correction that requires fewer computational and storage resources; and which accurately addresses the prevalence of specific errors unique to mobile devices.

Much of the discussion contained herein will refer to text as words containing letters from the Roman alphabet. The discussion and examples utilizing Roman alphabet letters is purely exemplary in nature. The present invention is intended to also extend to alternate languages where symbols, glyphs or characters are strung together to produce text. For example, in Chinese a particular string of traditional calligraphic symbols, known as the Zhuyin or BoPoMoFo alphabet, may be compiled as to create a character. In Japanese, beyond the ideographic Kanji characters lie a pair of syllabaries called the Kana, and these too are covered by the present invention. Likewise, the present invention may extend to standard Romanization systems, such as Pinyin for Mandarin. It will be seen that the exemplified system and method for text correction is versatile enough to apply not only to Roman alphabets, but any language's symbology.

II. Character Correction System

Figure 1:
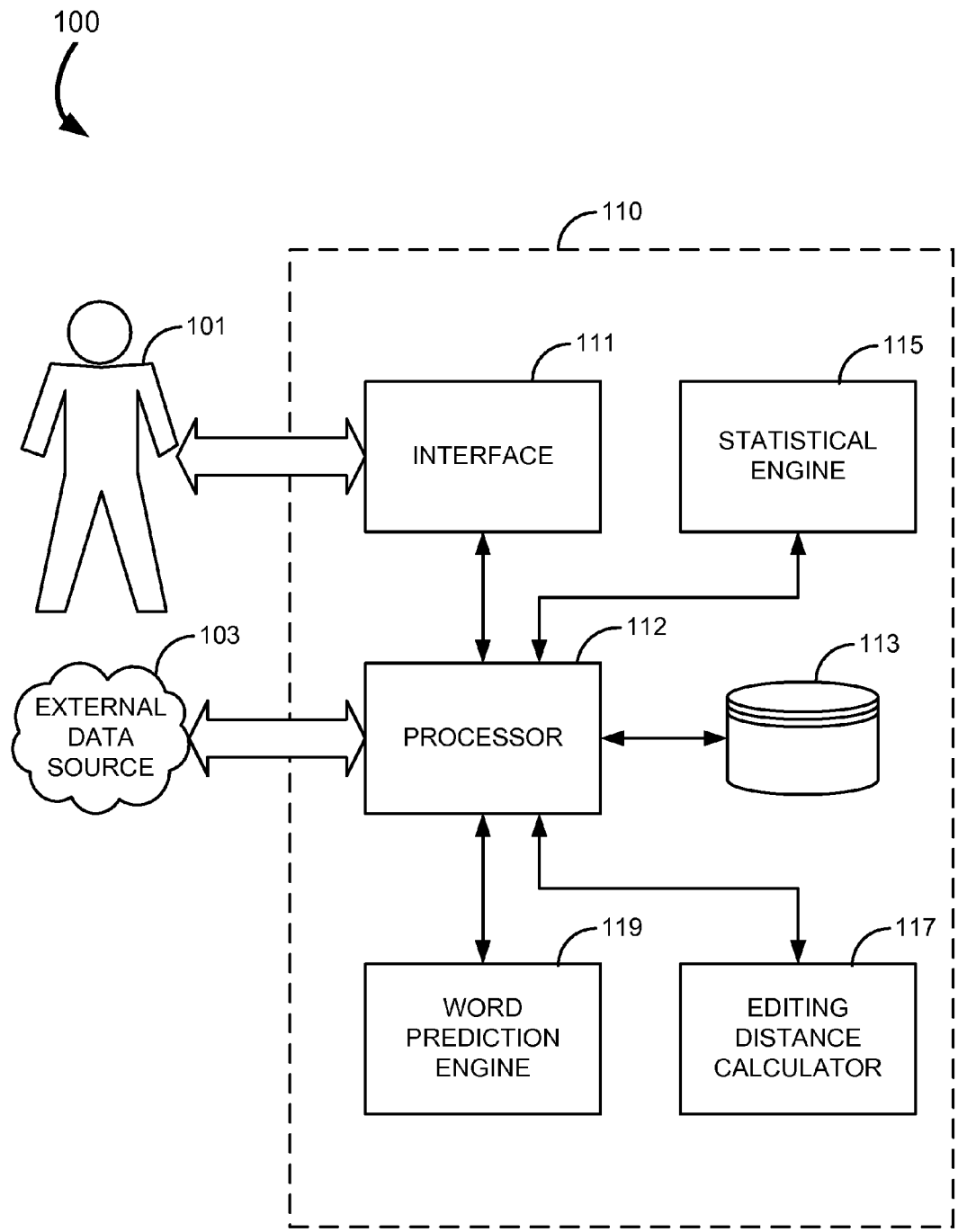
FIG. 1 shows a logical block diagram of the text correction system in accordance with an embodiment of the present invention.

To facilitate discussion, FIG. 1 shows a logical block diagram of the Text Correction System 100. A User 101 interacts with the Text Corrector 110 via the Interface 111. In some embodiments, the Text Corrector 110 includes the Interface 111, a Processor 112, a Database 113, a Statistical Engine 115, an Editing Distance Calculator 117 and a Word Prediction Engine 119. Interface 111, Database 113, Statistical Engine 115, Editing Distance Calculator 117 and Word Prediction Engine 119 couple to the Processor 112. The Processor 112 may also, in some embodiments, couple to an External Data Source 103. External Data Source 103 may include a Wide Area Network (WAN) such as the internet, a cellular phone network, another device such as one's personal computer, or any desired data source. Typically, in some embodiments, External Data Source 103 may enable the transfer of text data from the Text Corrector 110 to other devices for receipt by the intended recipients.

Text Corrector 110 may be contained within a mobile device such as a Personal Digital Assistant (PDA), cellular phone, computerized organizer, personal computer, Blackberry or similar device, as is well known by those skilled in the art. While the disclosed invention is, in some embodiments, shown for use by mobile devices, the present invention is not intended to be limited to devices that are mobile. For example, in some embodiments, the present invention may be utilized upon a standard desktop computer, cash register, land line telephone, or any text capable device.

Additionally, in some embodiments, the User 101 is not required for the Text Correction System 100. For example, if the Text Corrector 110 receives text data from the External Data Source 103 the Text Corrector 110 may perform text error correction without receiving input from the User 101.

Interface 111 may be a keypad, touch screen, stylus pad, or any input device. Additionally, in some embodiments, Interface 111 may also provide an output such as a screen or sound output. Alternate systems of input and output may be utilized by the Interface 111 as is well known by those skilled in the art. The Interface 111 facilitates input from the User 101 to the Processor 112.

Besides poor spelling on the part of the user, standard full keyboard entry exhibits two essential error types: mis-stroked keys and mis-actuated keys. Mis-stroked keys tend to yield single error points in a word. This condition is relatively easily to remedy. Fuzzy typing methods recognize that the bulk of errors are simply a keystroke displaced by one key from the intended key. For example the entry 'wors' can be tested by comparing against the dictionary and if an error is detected then the word can be tested again substituting in turn each letter with an adjacent letter from the keyboard. So, the letter 'W' from a standard qwerty keyboard could be replaced in turn to see if any of "Q,1,2,3,E,D,S or A" and so on for each letter of the word.

The second common error occurs when a key is not actuated properly, or mis-actuated, and either the letter is not entered or double entered. A current algorithm may check for words which are one letter too long or too short. Unfortunately, if this is carried to extremes, the user may be defeated by the resulting gibberish. In the example above, the suggested repair for "wors" may be one of "worst, worse, wars, works, word or words." The most likely in our common experience may of course be "word". Thus, if a user persistently makes this error, an appliance may be able to recognize the repetitive mistake and the quality of response can be improved.

The Database 113 may provide statistical information, dictionary data, User 101 preference and habit data, and saved grid comparison data to the Processor 112 for facilitating error correction.

The Statistical Engine 115, coupled to the Processor 112, may generate and provide statistical data as to the likelihood of string substitution, and for use in grid comparisons. Statistical Engine 115 may also, in some embodiments, compile User 101 habits and preferences for storage in the Database 113.

The Editing Distance Calculator 117 performs grid comparisons between the inputted word and candidate words to determine editing distance. Variable costs utilized in the generation of editing distance may be provided by the Statistical Engine 115.

The Word Prediction Engine 119 predicts words for the creation of candidate word lists. In some embodiments, the Word Prediction Engine 119 may use fuzzy logic in order to select the candidate word lists. Fuzzy logic is derived from fuzzy set theory dealing with reasoning that is approximate rather than precisely deduced from classical predicate logic. It can be thought of as the application side of fuzzy set theory dealing with well thought out real world expert values for a complex problem. In some embodiments, the Processor 112 may include the functionality of any of the Statistical Engine 115, Editing Distance Calculator 117 and Word Prediction Engine 119. Alternatively, in some embodiments, additional components may be incorporated into the Text Corrector 110 as is desired.

Figure 2A:
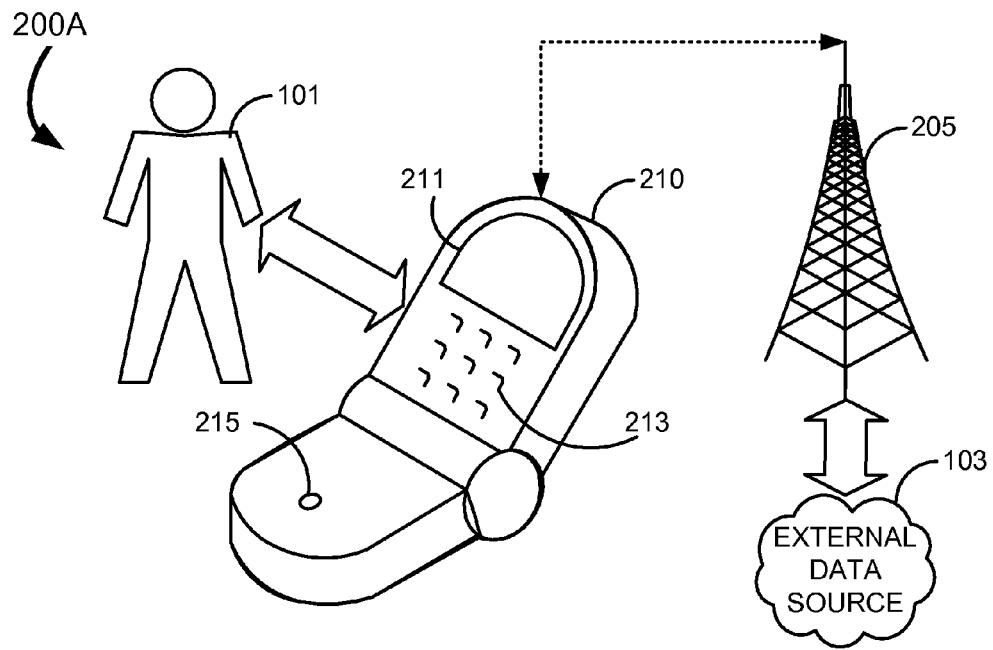
FIG. 2A shows an illustration of a user interaction with a wireless mobile device in accordance with an embodiment of the present invention.

FIG. 2A shows an illustration of a user interaction with a wireless mobile device, shown generally at 200A. In this exemplary illustration the User 101 is seen interacting with a Cell Phone 210. The Cell Phone 210 includes a Display 211, Keypad 213 and Microphone 215, which collectively comprise the Interface 111 of the Cell Phone 210. The Keypad 213 in the exemplary illustration may include a non-deterministic, or ambiguous, keypad. The Cell Phone 210 may be coupled, wirelessly, to the External Data Source 103 via a Wireless Receiver 205. In some embodiments, the Wireless Receiver 205 may include a Bluetooth adapter, radio tower, access point, or any other wireless signal intermediary.

Figure 2B:
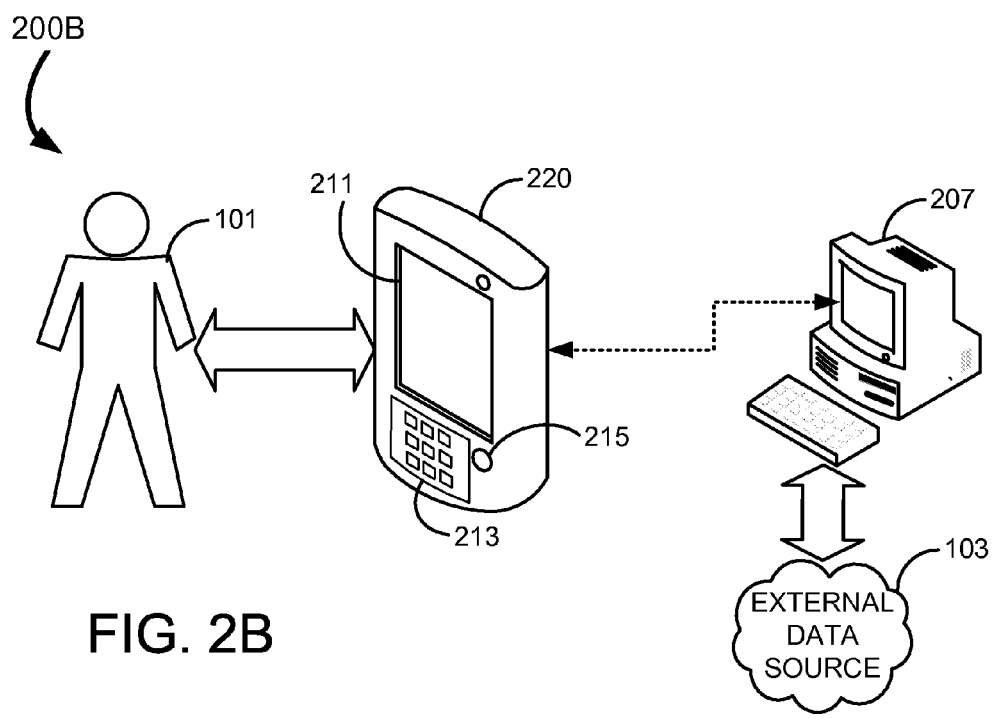
FIG. 2B shows an illustration of a user interaction with a wired mobile device in accordance with an embodiment of the present invention.

FIG. 2B shows an illustration of a user interaction with a wired mobile device, shown generally at 200B. In this exemplary illustration the User 101 is seen interacting with a PDA 220. Similar to Cell Phone 210 above, the PDA 220 includes a Display 211, Keypad 213 and Microphone 215, which collectively comprise the Interface 111 of the PDA 220. The Keypad 213 in the exemplary illustration may include a deterministic keypad. The PDA 220 may be coupled, via a wire, to the External Data Source 103 via a Computer 207. In some embodiments, the Computer 207 may include a company Wide Area Network (WAN) or any other signal intermediary.

It should be noted that the PDA 220 may rely upon wireless methods to couple to the External Data Source 103. Likewise, Cell Phone 210 may rely upon a wired connection. The intent of these exemplary illustrations, as seen in FIGS. 2A and 2B, is to show the variety of device configurations that the Text Correction System 100 is designed for use in.

Figure 3:
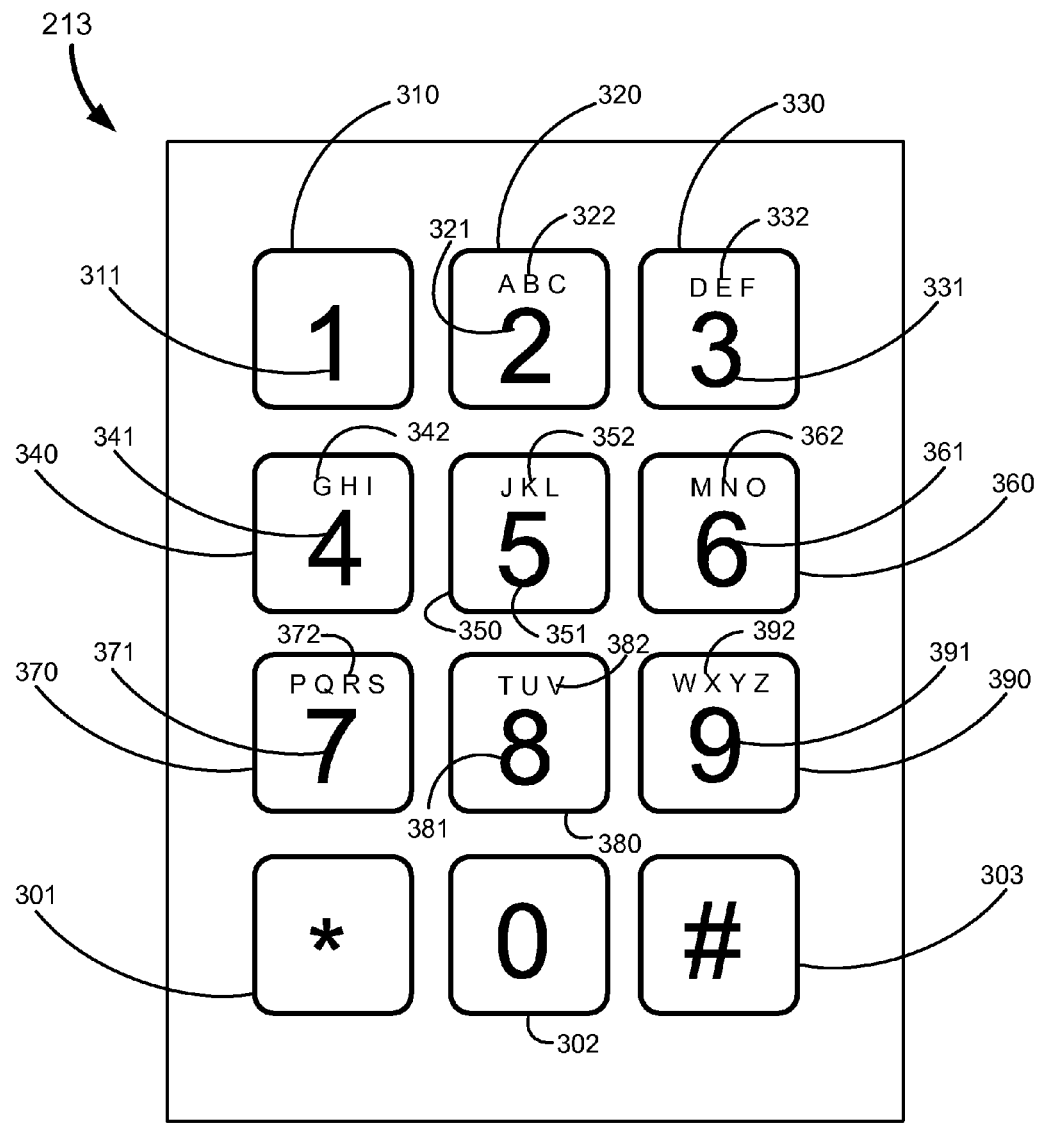
FIG. 3 shows an illustration of an ambiguous style keypad associated with a mobile device in accordance with an embodiment of the present invention.

FIG. 3 shows an illustration of an ambiguous style Keypad 213 associated with many mobile devices. Such a Keypad 213 may be often found upon phones and other devices with limited key space. In an ambiguous Keypad 213 each Numerical Key 310, 320, 330, 340, 350, 360, 370, 380, 390 contains both a Numeral 311, 321, 331, 341, 351, 361, 371, 381, 391, and a set of three or four Letters 312, 322, 332, 342, 352, 362, 372, 382, 392. As previously stated, the Letters 312, 322, 332, 342, 352, 362, 372, 382, 392 may be that of any language desired and is not limited to the Roman alphabet. The non-numeric Keys 301, 302 and 303 may likewise include characters and symbols, such as punctuation and spaces.

The ambiguous Keypad 213 may rely upon the number of times any particular Numerical Key 310, 320, 330, 340, 350,

360, 370, 380, 390 is pressed to generate a specific letter, or character. Alternatively, in some embodiments, the device may interpret a string of key hits and disambiguate the intended letters. Lastly, in some embodiments, a combined system of multiple key hits and disambiguation may be utilized for text entry into an ambiguous Keypad 213.

In the case of the deterministic Keypad 213, which is not illustrated, the Keypad 213 would have one character per key. One method of implementing a single character per key in a reduced format is to incorporate keys which may be rocked in four principal directions, each direction representing a single symbol, yet requiring only the area used by a single key. Deterministic Keypad 213 may sometimes cause a reduction in errors over the ambiguous Keypad 213. However, since many deterministic Keypads 213 are often still very small, text errors of mis-keying, or mis-stroked keys, are still very common.

On a Deterministic Keypad 213 it is possible to identify preferred error directions. A chart may be drawn up to measure how far away a keypress error would have been, and a assumption made that the possible word having the least divergence from the entered word would be the most likely. Computationally this is quite simple, but is still inclined towards unwieldiness when applied to a large vocabulary.

Thus, it may be seen that typical errors are not arbitrary, and the prevalence of the errors may be dependent upon Keypad 213 type and method of text input.

III. Methods of Character Correction

Figure 4:
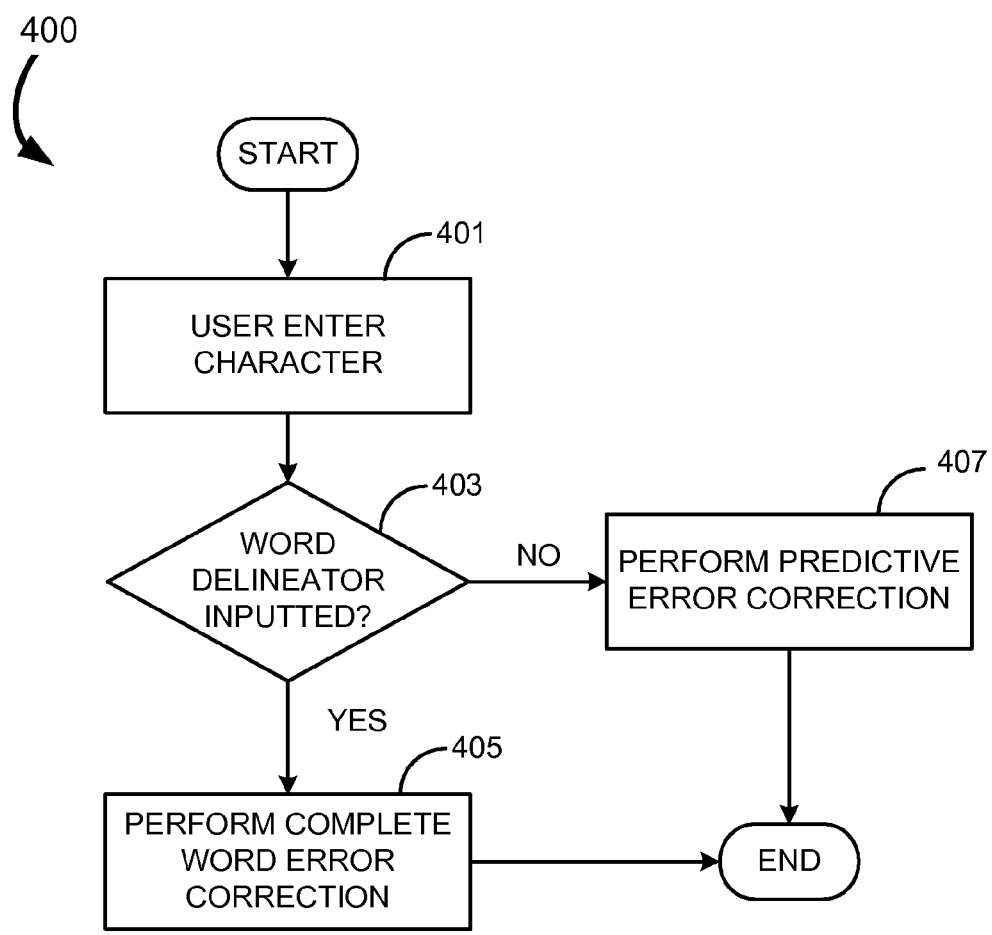
FIG. 4 shows a flow chart illustrating a process of text correction in accordance with an embodiment of the present invention.

FIG. 4 shows a flow chart illustrating a process of text correction, shown generally at 400. The process begins at step 401, where the user enters characters. An inquiry is then performed, at step 403, as to whether a word delineator has been entered in a character string. Delineators, or delimiting characters, may include spaces, quotations, or other punctuations which signify the completion of a word. If no delineator is encountered, then predictive word correction may be performed, at step 407. Predictive word correction enables rapid and efficient word entry when typing. Predictive word correction relies upon statistical analysis of future letter input, dependent upon previous character input. In some embodiments, a suggestive text box may be displayed to the User 101 with a list of predicted words. The User 101 may then select the intended word from the list of predicted words. In these embodiments, text input speed and efficiency may be increased. The process then ends.

Else, if a delineator is encountered, at step 403, the process then proceeds to step 405 where completed word error correction is performed. The process then ends.

In some embodiments, the process illustrated at 400 may be continuously performed as text is input by the User 101. In some alternate embodiments, the process illustrated at 400 may be performed less frequently, such as on every third keystroke until the end of the word is reached.

Figure 5:
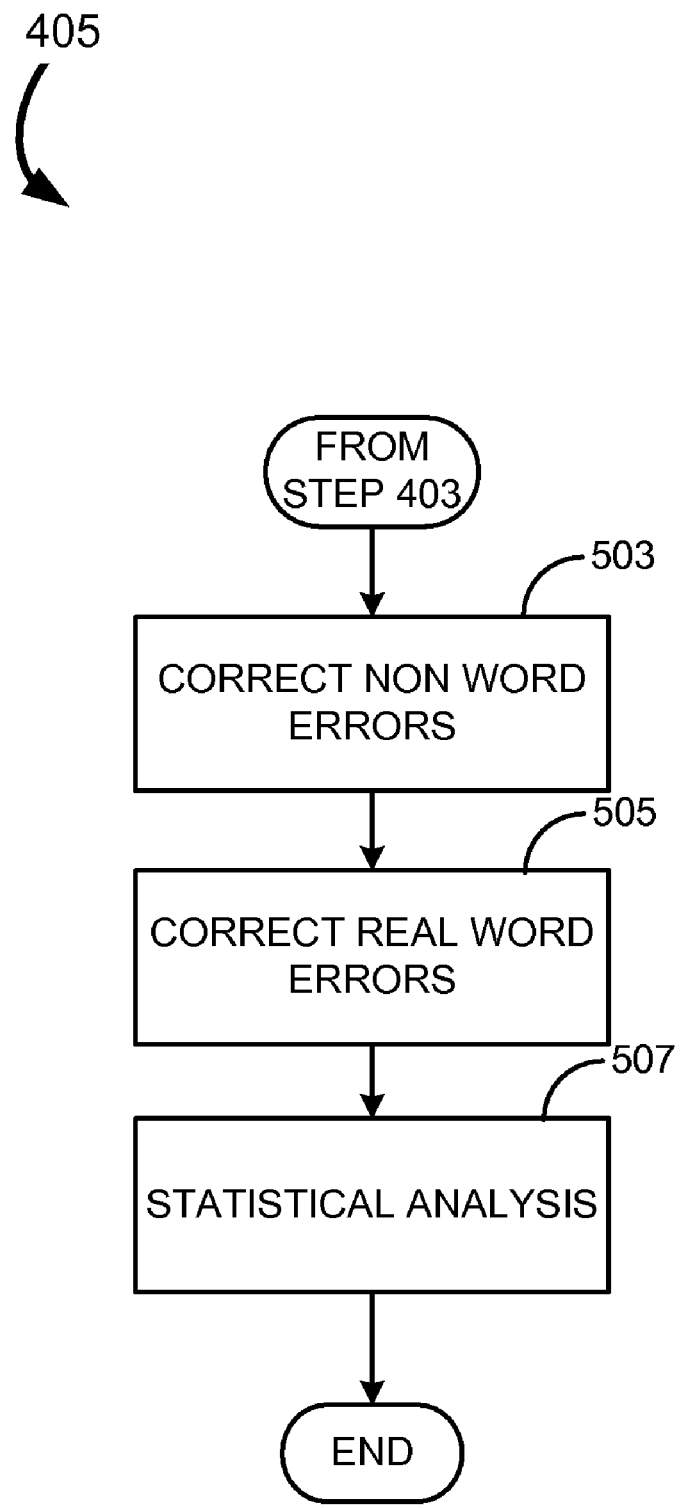
FIG. 5 shows a flow chart illustrating a process of completed word text correction in accordance with an embodiment of the present invention.

FIG. 5 shows a flow chart illustrating a process of completed word text correction, step 405 from FIG. 4. The process begins from step 403 of FIG. 4 where an inquiry is made as to whether a delineator exists. The process then proceeds to step 503, where non-words are corrected for. Non-words are the common errors resulting from mis-stroked keys and non-actualized keystrokes, as a word not found in the dictionary results. Non-words may be readily identified by a comparison of the inputted word to a dictionary, or other word corpus.

The process then proceeds to step 505, where real-word errors are corrected. Real-word errors include the usage of a word found in the dictionary, yet is incorrect in context of the inputted text. A common example of this is the incorrect usage of "their" instead of "there". Another common real-word error caused my mis-typing includes "form" instead of "from". Real-word errors are often more difficult to identify because statistical, or grammatical rule based algorithms are typically required.

After, real-word errors are corrected for, the process then proceeds to step 507, where a statistical analysis of the errors may be performed. In some embodiments, such an analysis may document errors to compile error type and frequency of errors for any particular User 101. Such statistical data may then, in some embodiments, be further utilized in order to tune the error correction steps in subsequent text corrections. The process then ends.

A. Non-Word Error Correction

Figure 6:
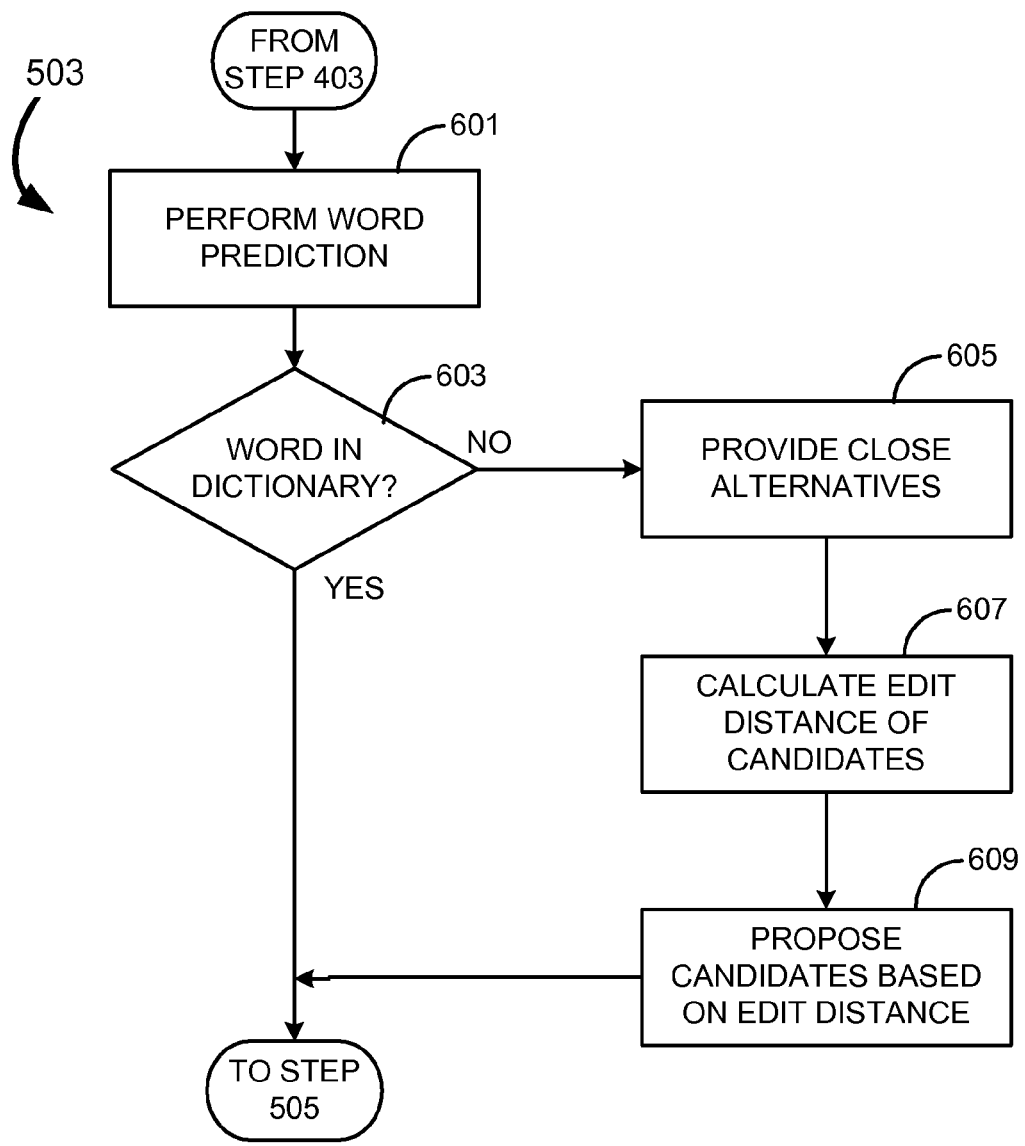
FIG. 6 shows a flow chart illustrating a process of non-word correction in accordance with an embodiment of the present invention.

FIG. 6 shows a flow chart illustrating a process of non-word correction, step 503 from FIG. 5. The process begins from step 403 of FIG. 4 where an inquiry is made as to whether a word delineator exists. The process then proceeds to step 601 where word prediction is performed. Then at step 603, an inquiry is made as to whether the input word is found in the dictionary. As previously stated the dictionary may be a static dictionary, or a dynamic corpus that changes with the User 101. Alternatively, in some embodiments, multiple corpuses may be queried. For example in some mobile devices a fixed dictionary may include approximately 10,000 to 100,000 words. The word amounts often depend upon memory requirements as compared to functionality, and as such, different word numbers may be included within the fixed dictionary. Additionally, a user specific corpus may be generated that stores a rapidly accessible set of words that are frequently used by the User 101. As previously stated, the term "word", as used in this application, refers not only to words generated from a Roman alphabet, but any character string, in any language, to form words or symbols.

If the inputted word is found in the dictionary, in step 603, then the process ends by progressing to step 505 of FIG. 5. In such a circumstance the word is a real-word error.

Else, if the inputted word is not found in the dictionary, in step 603, the process then proceeds to step 605, where close alternatives to the inputted word are provided. The close alternative words may be generated form the word prediction performed in step 601. The close alternatives, collectively, constitute a list of candidate words.

The process then proceeds to step 607, wherein the editing distance is calculated between the inputted word and each of the candidate words selected in step 605. Editing distance may be computed using a variety of methods, as is well known by those skilled in the art. In some embodiments, a grid comparison may be utilized to determine the editing distance between the inputted word and the candidate word. As previously stated, editing distance refers to the degree of attenuation between the two words as measured by costs of character addition, deletion and substitution.

The process then proceeds to step 609, where one or more of the candidate words are proposed as a result of the editing distance analysis. These selected candidate words may be referred to as the preferred candidates, as being preferred choices over the original predicted candidate list. Selection of these preferred candidate(s) may be performed by selecting one or more candidates with the lowest editing distance values. In some embodiments, preferred candidate(s) may be selected as those candidates having editing distance values less than a threshold value. Such a threshold may be a pre-configured value, or may be dynamically configured as a result of User 101 activity, or word types. The process then ends by progressing to step 505 of FIG. 5.

B. Editing Distance Calculation

Figure 7:
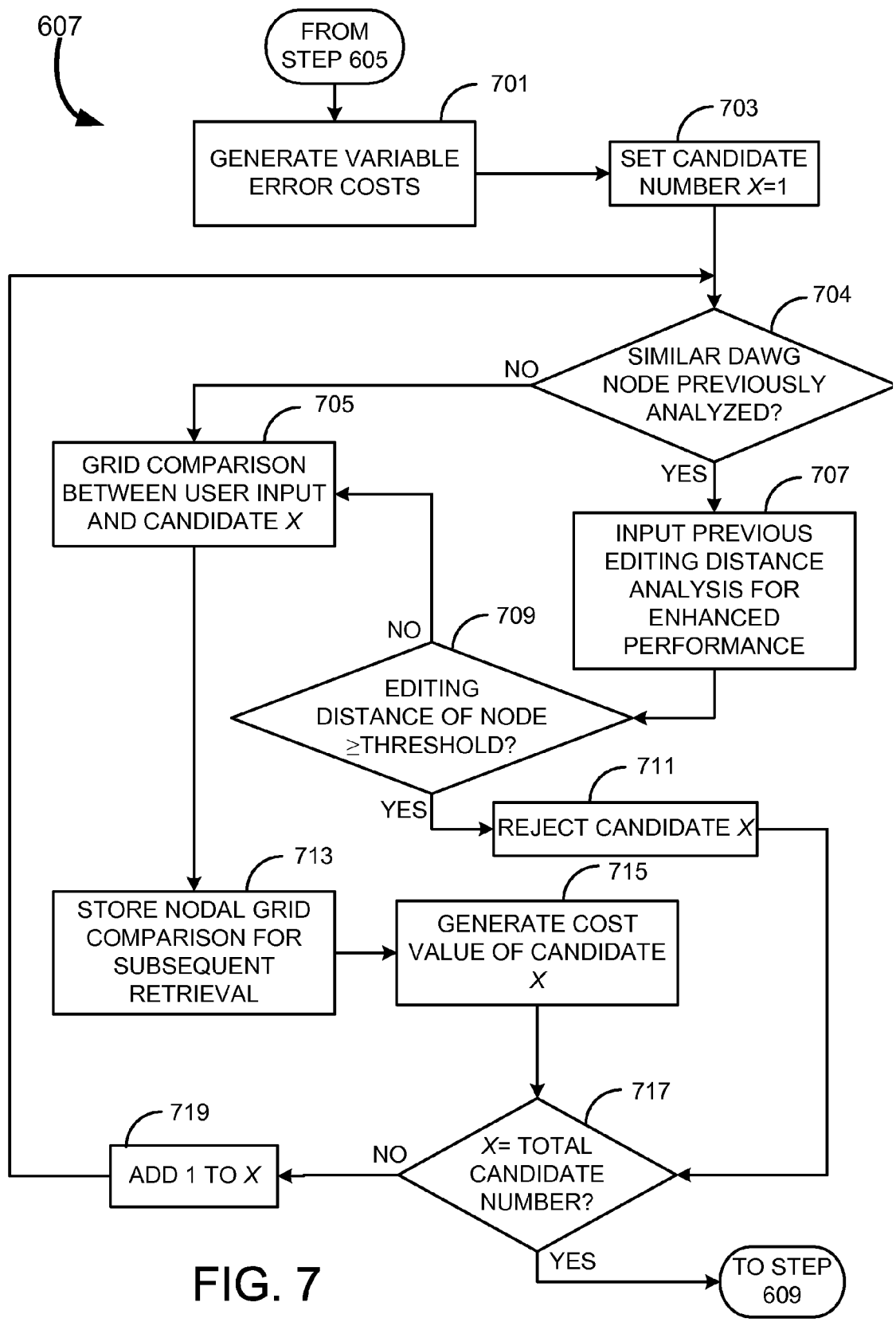
FIG. 7 shows a flow chart illustrating a process of edit distance calculation in accordance with an embodiment of the present invention.

FIG. 7 shows a flow chart illustrating a process of edit distance calculation, step 607 from FIG. 6. The process begins from step 605 of FIG. 6, and then progresses to step 701 where variable error costs are generated. Variable error costs enable the disclosed invention, in some embodiments, to accurately reflect the realities of text input on mobile device keypads. For example, substitution costs for specific letters may be lower for keys located next to one another. Variable cost will be discussed in more detail below.

The process then proceeds to step 703, where a placeholder X is set to equal 1. The placeholder X stands for the candidate word number. Thus the process will iteratively cycle through each candidate X before completion. At step 704 an inquiry is made as to whether a similar Directed Acyclic Word Graph (DAWG) node analysis has been previously performed. A directed acyclic word graph is a data structure that is used to represent a set of strings and supports a constant time search operation. Each node in the graph represents a unique substring. Substrings that appear more than once correspond to nodes with correspondingly many out-edges. The impact of analyzing present comparisons to previously completed comparisons acts to shortcut the grid analysis required, thereby reducing processor demands. Typically, a reduced processor demand is beneficial. This is particularly true when dealing with mobile devices that have relatively fewer processing and battery resources than sedimentary devices. The usage of a DAWG node, in some embodiments, includes the efficient storage and retrieval of said comparisons. Of course, additional methods of previous comparison storage and retrieval may be utilized, as is known to those skilled in the art.

If, at step 704, one or more nodal comparisons previously performed are similar to segments of the current comparison, the editing distance of these nodes may be inputted into the current editing distance analysis at step 707. As previously mentioned, inputting the segmented editing distance eliminates the need to perform cell calculations for that portion of the grid analysis, thus reducing processor demands and the related power consumption. Moreover, an inquiry may then be performed as to whether the editing distance of the inputted, pre-analyzed nodes are above a threshold, at step 709. Such an inquiry may eliminate candidates before further processing is expended, since the nodal editing distance values will only increase with the editing distance analysis of the remaining cells in the grid. Thus, the process may be shortcut when the degree of attenuation between the candidate and the inputted word is obviously too great.

If, at step 709, the inputted editing distance of the nodal segments is greater than the threshold, then the candidate X is rejected from being considered for one of the preferred candidate(s), at step 711. Thus, futilely attenuated candidates are eliminated early, thereby conserving processing and power consumption. The process then proceeds to step 717 where an inquiry is made as to whether X is equal to the total candidate number. If X is equal to the total candidate number then the process ends by progressing to step 609 of FIG. 6.

Otherwise, if at step 717 X is does not equal the total candidate number the process then proceeds to step 719, where 1 is added to the value of X. The process then proceeds to step 704, where an inquiry is made whether the new candidate X has had a similar DAWG node analysis previously performed. In this way each candidate is sequentially analyzed for editing distance.

Else, if at step 709, the editing distance of the inputted similar nodes is not above the threshold, the process then proceeds to step 705 where a grid comparison is performed between the inputted word and the candidate X. Results of the grid analysis may be stored, referenced by the nodal points, in the Database 113 for subsequent retrieval on another comparison, at step 713. Then, at step 715, the cost value of candidate X is generated. Cost value, also referred to as the editing cost or editing distance or attenuation level, is identified from the completed grid comparison performed at step 705. The process then proceeds to step 717 where an inquiry is made as to whether X is equal to the total candidate number. If X is equal to the total candidate number then the process ends by progressing to step 609 of FIG. 6.

Otherwise, if at step 717 X is does not equal the total candidate number the process then proceeds to step 719, where 1 is added to the value of X. The process then proceeds to step 704.

Figure 8:
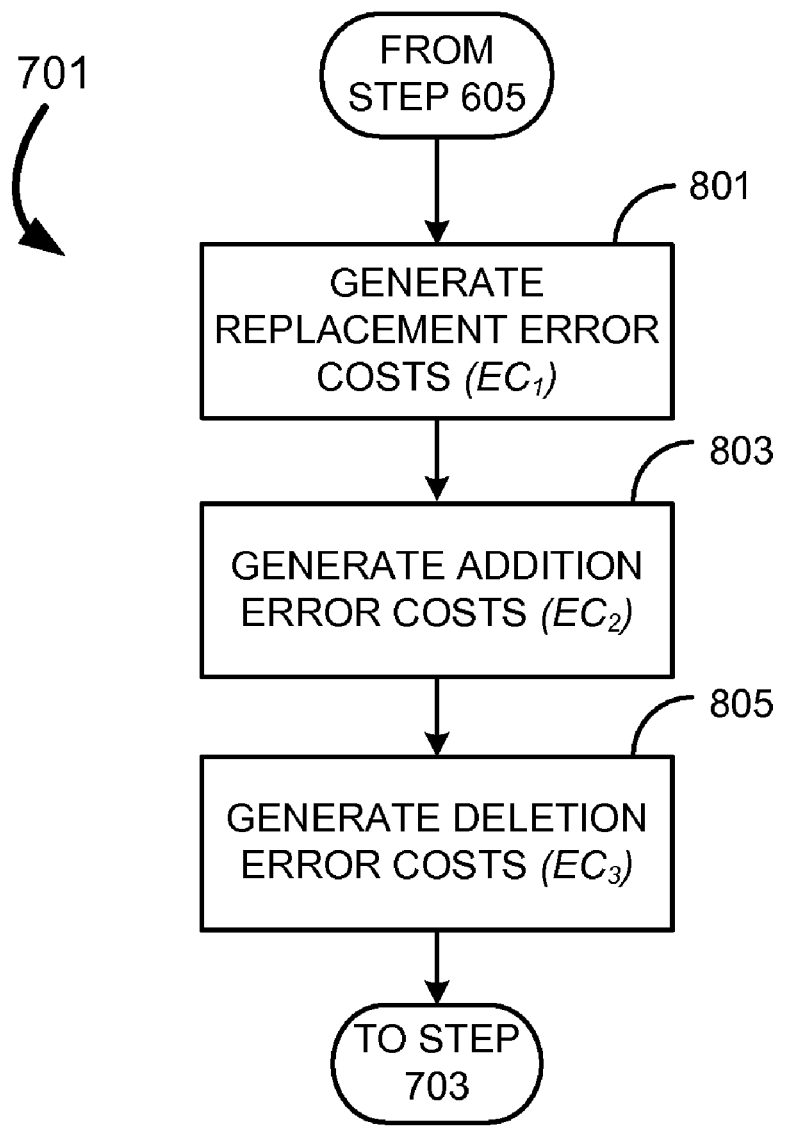
FIG. 8 shows a flow chart illustrating a process of generating variable error costs in accordance with an embodiment of the present invention.

FIG. 8 shows a flow chart illustrating a process of generating variable error costs, step 701 from FIG. 7. The process begins from step 605 of FIG. 6. The process then proceeds to step 801 where replacement, or substitution, error cost variable "$EC_1$" is generated. Replacement cost refers to the "error cost" associated of replacing one letter of the inputted word to match the candidate character. The process then proceeds to step 803 where addition error cost variable "$EC_2$" is generated. Addition cost refers to the "error cost" associated of adding one letter of the inputted word to match the candidate word. The process then proceeds to step 803 where deletion error cost variable "$EC_3$" is generated. Deletion cost refers to the "error cost" associated of deleting one letter of the inputted word to match the candidate word.

In some embodiments, the error costs "$EC_1$", "$EC_2$" and "$EC_3$" may be a single value. In some embodiments, these values may be variable depending upon an algorithm. In some alternate embodiments, the error costs may be sets of matrices, wherein compared characters may be cross referenced on the matrix for finding the error cost. In embodiments that utilize static tables, or matrices, fewer processing requirements are placed upon the device since less computation is required.

Error cost values may be generated from the statistical probabilities of the particular error having occurred. For example, the substitution of "g" for "f" may have a lower error cost than the substitution of "g" for "k" on a deterministic keyboard. The reason for this is that the keys "g" and "f" are adjacent on such a keyboard, whereas "g" and "k" are separated by two keys. Empirical data collected on the frequency of mis-keying and non-keying, non-actualizing, may be collected for the generation of these error values.

Additionally, in some embodiments, error costs may be developed specifically for different keyboard types. For example, deterministic and ambiguous keyboards will have different distributions of error frequency. Moreover, size and sensitivity of the keyboard may further skew the frequency of particular errors. For example, very small keyboards may have more frequent mis-keying errors since the keys are so closely packed together. In response the particular replacement error costs "$EC_1$" may, in some embodiments, be lower in value as compared to the replacement costs of a larger keyboard. Likewise, a very sensitive keyboard may have a higher incidence of "double hits", where the key is struck repetitively instead of once. Thus, such a keyboard may, in some embodiments, incur reduced deletion error costs "$EC_3$".

In some embodiments, statistical data may be collected for each keyboard utilized with the Text Correction System 100. In some alternate embodiments, general attributes may be defined for the keyboard, and these attributes may be utilized to estimate the statistical data. For example, a manufacturer of a device may label the key pad as a deterministic, small and sensitive keypad. Basic statistics of other deterministic, small and sensitive keypads may be compiled to generate a close estimate of the statistical error costs of the manufacturer's keypad. Such estimations enable the usage and simple adaptation of the Text Correction System 100 to a vast array of devices without extensive individual testing.

Additionally, in some embodiments human tendencies may be incorporated into the error costs "$EC_1$", "$EC_2$" and "$EC_3$". For example, a common error when typing on a deterministic keyboard is to type "teh" instead of "the". Thus, in these situations, the replacement costs of the "e" and "h" may be reduced to reflect these increased frequencies of errors. Likewise, people tend to type and text the first three letters of most words accurately, with a marked reduction in spelling accuracy after the initial letters. Error costs may, in some embodiments, be able to reflect these tendencies by increasing error values for any initial letter mismatches.

Lastly, in some embodiments, particular errors may be more frequent dependent upon the particular User 101. Thus, in some embodiments, error costs may be fashioned in order to reflect the error patterns of User 101 and adjust the error costs accordingly. Moreover, in some embodiments, particular inputted words that infallibly are intended to be a particular candidate may have a gross error modifier, which lowers the final editing cost of the likely candidate. Such a modification may be useful when the User 101 consistently misspells particular words, or routinely leaves out certain characters.

Thus, in some embodiments, the error values generated may account for frequency of errors due to keyboard configuration, human tendencies and personal tendencies. Of course, in some embodiments, greater or fewer error factors may be incorporated into the computation of editing distance as is desired.

FIG. 9 shows a flow chart illustrating a process of grid comparison between the inputted string and candidate string, step 705 from FIG. 7. The process begins from step 704 of FIG. 7. The process then proceeds to step 901, where an inquiry is made as to whether the candidate character string and the inputted word are of equal length. If the inputted word and the candidate word are of equal length the process then proceeds to step 909 where the inputted word is placed in the row header of the comparison grid, where each character of the inputted word occupies a cell of the row header. Then, at step 911, the candidate word is paced in the column header of the comparison grid, where each character of the candidate word occupies a cell of the column header. The process then proceeds to step 913, where increasing numbers, starting from zero, are inputted into the first column cells. Likewise, increasing numbers, starting from zero, are inputted into the first row cells. In some embodiments, the numbers may be increasing consecutive integers; however, any set of increasing numbers may be utilized as is desired. The process then proceeds to step 915 where the cell comparison is performed. The process then ends by proceeding to step 713 of FIG. 7.

Else, if at step 901 the candidate character string and the inputted word are not of equal length. The process then proceeds to step 902 where an inquiry is performed as to whether a square comparison grid, or matrix, is desired. If a square comparison grid is desired, the process then proceeds to step 903 where an inquiry is made as to whether inputted word is longer than the candidate word. If inputted word is longer than the candidate word, then the inputted word may be reduced in length to the candidate word length at step 905. The process then proceeds to step 909 where the reduced inputted word is placed in the row header of the comparison grid, where each character of the reduced inputted word occupies a cell of the row header. Then, at step 911, the candidate word is paced in the column header of the comparison grid, where each character of the candidate word occupies a cell of the column header. The process then proceeds to step 913, where increasing numbers, starting from zero, are inputted into the first column cells. Likewise, monotonically increasing numbers, starting from zero, are inputted into the first row cells. In some embodiments, the numbers may be increasing consecutive integers; however, any set of increasing numbers may be utilized as is desired. The process then proceeds to step 915 where the cell comparison is performed. The process then ends by proceeding to step 713 of FIG. 7.

Else, if at step 903 the inputted word is not longer than the candidate word, then the inputted word may be increased in length to the candidate word length at step 907. The process then proceeds to step 909 where the lengthened inputted word is placed in the row header of the comparison grid, where each character of the lengthened inputted word occupies a cell of the row header. Then, at step 911, the candidate word is paced in the column header of the comparison grid, where each character of the candidate word occupies a cell of the column header. The process then proceeds to step 913, where increasing numbers, starting from zero, are inputted into the first column cells. Likewise, increasing numbers, starting from zero, are inputted into the first row cells. The process then proceeds to step 915 where the cell comparison is performed. The process then ends by proceeding to step 713 of FIG. 7.

Otherwise, if at step 902 a square comparison grid is not desired, the process then proceeds to step 904 where an inquiry is made as to whether the inputted word is longer than the candidate word. If the inputted word is longer than the candidate word, the process then proceeds to step 909 where the inputted word is placed in the row header of the comparison grid, where each character of the inputted word occupies a cell of the row header. Then, at step 911, the candidate word is paced in the column header of the comparison grid, where each character of the candidate word occupies a cell of the column header. The process then proceeds to step 913, where increasing numbers, starting from zero, are inputted into the first column cells. Likewise, increasing numbers, starting from zero, are inputted into the first row cells. The process then proceeds to step 915 where the cell comparison is performed. The process then ends by proceeding to step 713 of FIG. 7.

It should be noted that additional data structures may be utilized as is well known to those skilled in the art. For example, linked list arrays, or multidimensional matrices may be utilized for word comparisons.

Else, if at step 904 the inputted word is not longer than the candidate word, the process then proceeds to step 906 where the inputted word is placed in the column header of the comparison grid, where each character of the inputted word occupies a cell of the column header. Then, at step 908, the candidate word is paced in the row header of the comparison grid, where each character of the candidate word occupies a cell of the row header. The process then proceeds to step 913, where increasing numbers, starting from zero, are inputted into the first column cells. Likewise, increasing numbers, starting from zero, are inputted into the first row cells. The process then proceeds to step 915 where the cell comparison is performed. The process then ends by proceeding to step 713 of FIG. 7.

Placing the longer of the inputted word or candidate word in the row header ensures that the resulting comparison grid has the fewest columns possible. It will be seen below that minimizing the number of columns in the comparison matrix enables the reduction of memory requirements.

Figure 10A:
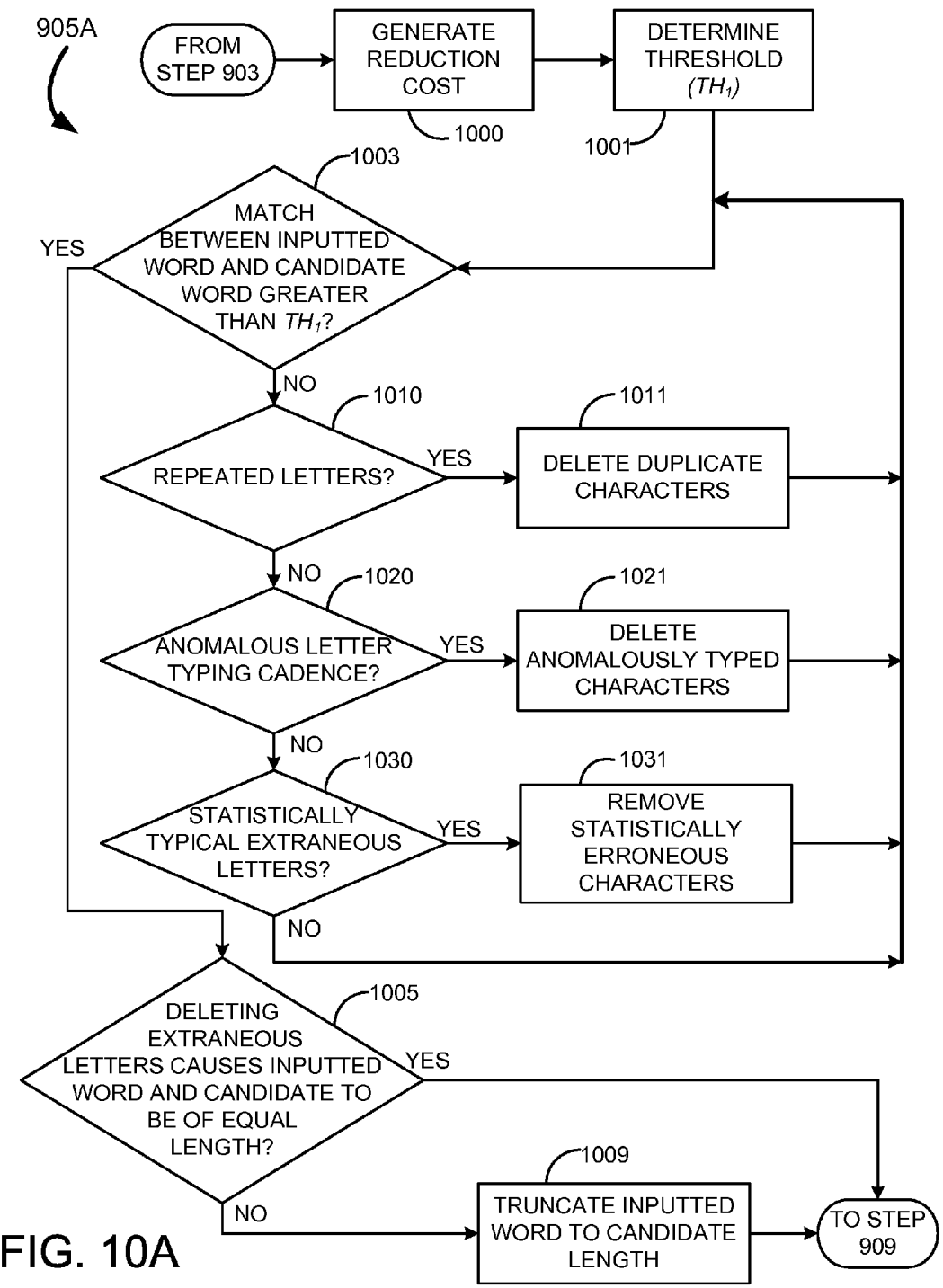
FIG. 10A shows a flow chart illustrating a process of reducing inputted string length to candidate string length in accordance with an embodiment of the present invention.

FIG. 10A shows a flow chart illustrating a process of reducing inputted string length to candidate string length, shown generally at 905A. This process is but one method of performing step 905 of FIG. 9. The process begins from step 903 of FIG. 9. The process then proceeds to step 1000 where a reduction cost is generated. This cost may depend upon the discrepancy between the inputted word and the candidate word. The reduction cost may then be added to the final editing distance cost to attribute for reductions required. Then, at step 1001 a threshold "$TH_1$" may be determined. The threshold "$TH_1$" may signify the degree of similarity between the inputted word and the candidate. This threshold may be predetermined, or configured by the User 101. Additionally, in some embodiments, the threshold "$TH_1$" may be a function of the candidate word length.

The process then proceeds to step 1003 where the inputted word characters and the candidate word letters are compared together. The number of correct matches may be compared to the threshold "$TH_1$", and an inquiry may be made if the direct matches are greater than the threshold. If matches are below the threshold the process then proceeds to step 1010 where an inquiry is made as to whether repeated characters are present in the inputted word. If inputted word has repeat letters, then the duplicate letters are removed in step 1011. Duplicate letters are often the most common sources of an inputted word being longer than the intended correct word. As such, removal of duplicate letters is performed first, in some embodiments. The process then proceeds to step 1003.

Else, if there are no repeated letters at step 1010, the process then proceeds to step 1020 where an inquiry is made as to the existence of an anomalous typing cadence. In some embodiments, the speed and cadence of the User 101 text input may be monitored. When there is a sudden and dramatic shift in cadence, such as two keys are hit nearly simultaneously, this may signify an activation keying error. For example, on a small keypad the User 101 may have inadvertently pressed two adjacent keys in one keystroke. In these situations cadence may be used as an indicator of error location in text. If at step 1020 there is an anomalous typing cadence, the process then proceeds to step 1021 where the anomalously typed letter may be removed. The process then proceeds to step 1003. It should be noted that the converse may also be true, where the intended double striking of a key yields only one recognized stroke because the cadence has exceeded the acceptable threshold speed of the keypad input algorithms.

Else, if there is no anomalous typing cadence found at step 1010, the process then proceeds to step 1030 where an inquiry is made as to whether the inputted word contains statistically typical extraneous letters. For example, often additional vowels may be included in words, particularly the vowel "e" at the end of words. If such typically extraneous letters are found at step 1030 they may be removed at step 1031. The process then proceeds to step 1003. Otherwise, if there are no typically extraneous letters are found at step 1030, the process then proceeds to step 1003.

Else, if at step 1003, the matches between the inputted characters and the candidate characters are above the threshold "$TH_1$" the process then proceeds to step 1005 where an inquiry is made as to whether deleting any extraneous letters in steps 1011, 1021 and 1031 caused the inputted word and candidate word to be of equal length. If so, then the process ends by progressing to step 909 of FIG. 9. Otherwise, if at step 1005 the deleting extraneous letters in steps 1011, 1021 and 1031 do not cause the inputted word and candidate to be of equal length, the process then proceeds to step 1009 where the inputted word is truncated to the same length, or number of characters, as the candidate word. The process then ends by progressing to step 909 of FIG. 9.

Below is an example of the reduction process outlined in FIG. 10A. Assume that the threshold "$TH_1$" is set to a value of 4. Additionally, assume that the word entered is "misstaeke". The comparison between the inputted word and the candidate, as performed at step 1003 may appear as follows in Table 1.

TABLE 1

| Inputted word | m | i | s | s | t | a | e | k | e |
|---|---|---|---|---|---|---|---|---|---|
| Candidate word | m | i | s | t |   | a | k | e |   |
| Match | 1 | 1 | 1 | 0 | 0 | 0 | 0 | 0 | 0 |

It may be seen that the match between the inputted word and the candidate word is equal to 3, which is less than the threshold of 5. Thus the analysis may proceed to step 1010 and 1011 where duplicate letters are identified and removed. In the example the duplicate "s" and be removed. The process may then return to step 1003, as illustrated at Table 2.

TABLE 2

| Inputted word | m | i | s | t | a | e | k | e |
|---|---|---|---|---|---|---|---|---|
| Candidate word | m | i | s | t | a | k | e |   |
| Match | 1 | 1 | 1 | 1 | 1 | 0 | 0 | 0 |

Now the matches equal 5, which is greater than the threshold of 4. Thus the process goes to step 1005. Since the input word and candidate word are not of equal length then the inputted word is truncated to "mistaek" at step 1009.

If however, the threshold "$TH_1$" is higher, say 5, then the process would proceed through step 1020, looking for changes in cadence, and 1030, looking for typically extraneous letters. Assuming the User 101 entering "misstaeke" simply misspelled the word without a cadence flag, then on the removal of typically extraneous letters the "e" at the end may be eliminated.

Figure 10B:
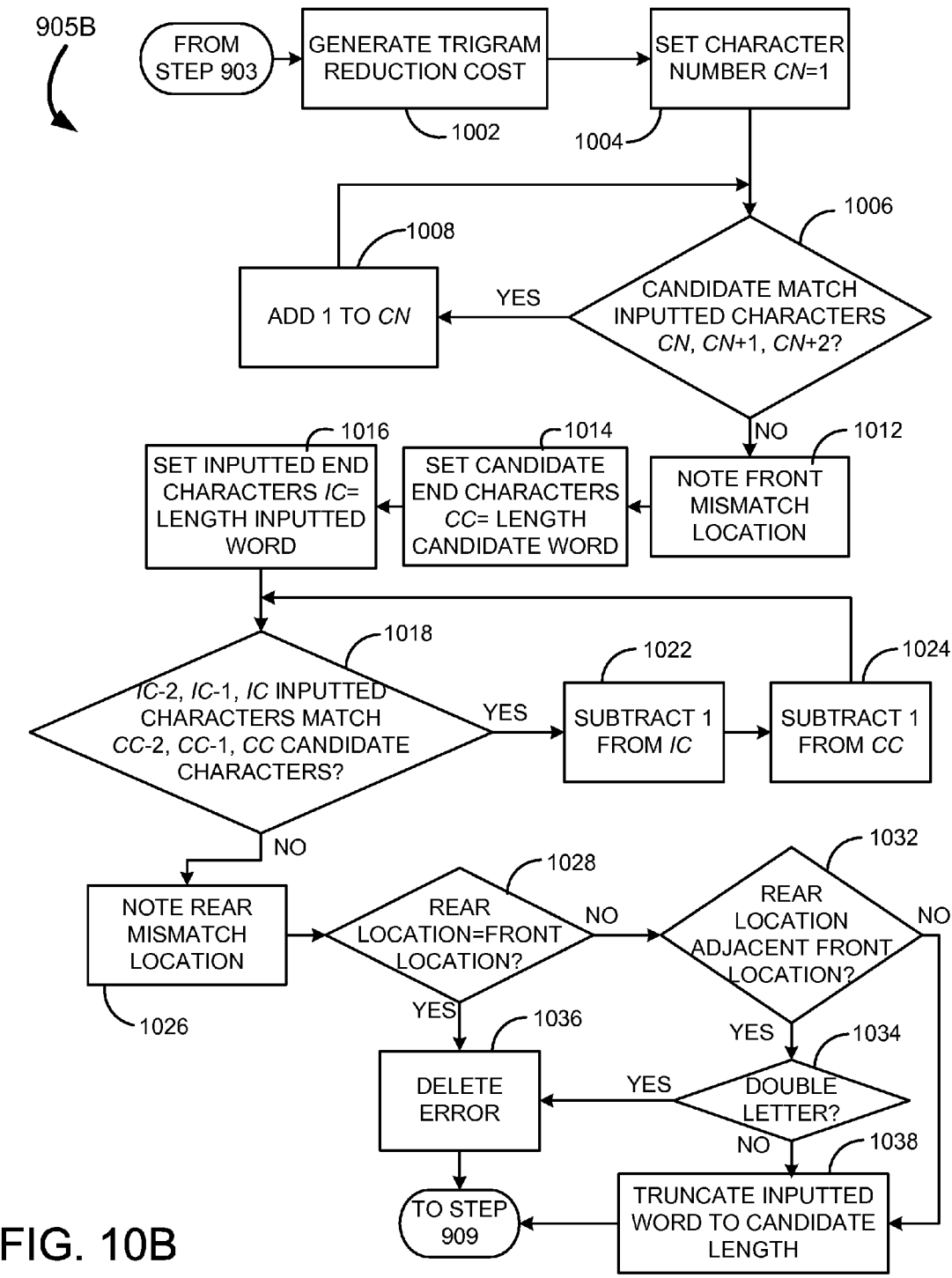
FIG. 10B shows a flow chart illustrating another process of reducing inputted string length to candidate string length in accordance with an embodiment of the present invention.

FIG. 10B shows a flow chart illustrating another process of reducing inputted string length to candidate string length, shown generally at 905B. This process is but one method of performing step 905 of FIG. 9. The process begins from step 903 of FIG. 9. The process then proceeds to step 1002, where a trigram reduction cost may be generated. This cost may depend upon the discrepancy between the inputted word and the candidate word. The trigram reduction cost may then be added to the final editing distance cost to attribute for reductions required. Then, at step 1004, a placeholder "CN" may be set to 1. At step 1006 an inquiry may be made as to whether CN, CN+1 and CN+2 characters of the inputted word and the candidate word match. If they match, the process then proceeds to step 1008 where 1 is added to CN. The process then returns to step 1006. If at step 1006, there is a mismatch, the process then proceeds to step 1012 where the mismatch location is noted. Then, at step 1014, a placeholder "CC" for the candidate word's characters is set to the candidate word length. Likewise, at step 1016, a placeholder "IC" for the inputted word's characters is set to the inputted word length. Then, at step 1018, the IC-2, IC-1 and IC letters of the inputted word and matched against the CC-2, CC-1 and CC letters of the candidate word, respectively. If at step 1018 there is a match, the process then proceeds to step 1022, where 1 is subtracted from IC. Likewise, 1 is subtracted from CC at step 1024. The process then returns to step 1018.

Else, if at step 1018 there is a mismatch, the process then proceeds to step 1026 where the rear mismatch location is noted.

An inquiry is then made as to whether the front mismatch location and rear mismatch location are the same, at step 1028. If the locations are the same the process then proceeds to step 1036 where the error is deleted. The process then ends by progressing to step 909 of FIG. 9.

Else, if the front mismatch location and rear mismatch location are not the same at step 1028, then an inquiry is made as to whether the front mismatch and rear mismatch are adjacent at step 1032. If they are not adjacent the inputted word is truncated to the candidate word length at step 1038. The process then ends by progressing to step 909 of FIG. 9.

Otherwise, if at step 1032 the mismatches are adjacent, the process then proceeds to step 1034 where an inquiry is made as to whether the adjacent letters are repeated letters. If the letters are duplicate letters then the double letter error is corrected for at step 1036. The process then ends by progressing to step 909 of FIG. 9.

Else, if at step 1034 the letters are not double letters then the inputted word is truncated to the candidate word length at step 1038. The process then ends by progressing to step 909 of FIG. 9.

The trigram method of error correction may be of particular use when the inputted word has a single added character error. The trigram method is only exemplary, and alternate methods such as an n-gram method may be utilized as is desired. However, in situations where the inputted word includes multiple errors, the trigram method may degenerate to a simple truncation method ensuring length of the inputted word is equal to the candidate method. As such, it is recognized that the methods of reducing the length of inputted words illustrated in FIGS. 10A and 10B are nonexclusive. As such, additional methods for the reduction of word lengths may be utilized, as is known to those skilled in the art.

Figure 11:
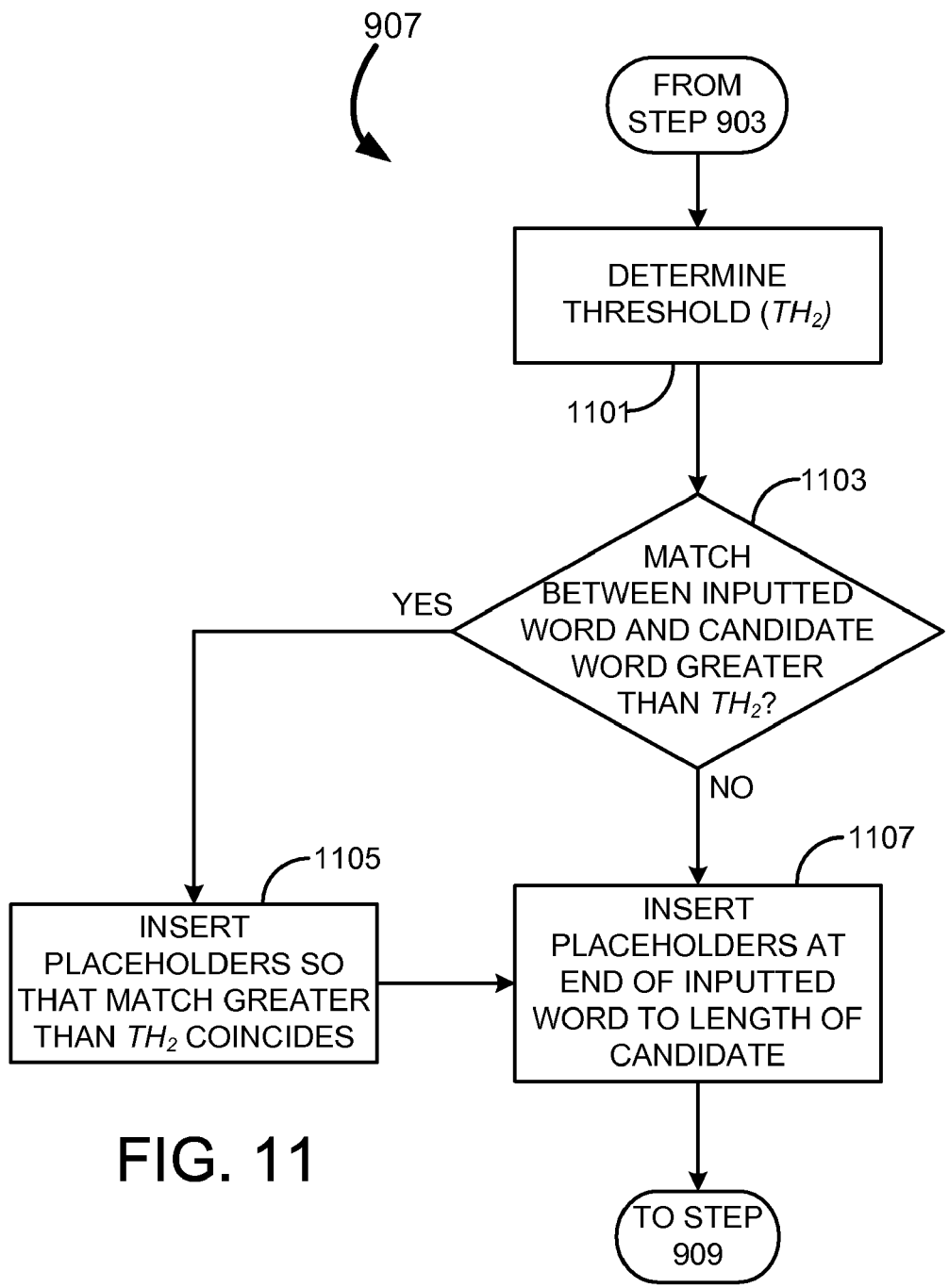
FIG. 11 shows a flow chart illustrating a process of lengthening inputted string length to candidate string length in accordance with an embodiment of the present invention.

FIG. 11 shows a flow chart illustrating a process of lengthening inputted string length to candidate string length, step 907 of FIG. 9. The process begins from step 903 of FIG. 9. Then, at step 1101, a threshold "$TH_2$" is determined. The threshold "$TH_2$" may signify the desired degree of similarity between the inputted word and the candidate. This threshold may be predetermined, or configured by the User 101. Additionally, in some embodiments, the threshold "$TH_2$" may be a function of the candidate word length.

An inquiry is then made, at step 1103, whether a match of greater than "$TH_2$" between the inputted word and the candidate word is possible. If a match of greater than "$TH_2$" is not possible, the process then proceeds to step 1107 where placeholders are inserted at the end of the inputted word until it is equal to the candidate length. The process then ends by progressing to step 909 of FIG. 9.

Else, if at step 1103 a match of greater than "$TH_2$" is possible, the process then proceeds to step 1105 where placeholders are inserted as to line up inputted word characters with the candidate word characters. The process then proceeds to step 1107 where placeholders are inserted at the end of the inputted word until it is equal to the candidate length. The process then ends by progressing to step 909 of FIG. 9.

For example, assume the inputted word is "dimutive" and the threshold "$TH_2$" is equal to 5. Shown below, at Table 3, is the comparison performed at 1103.

TABLE 3

| Inputted word | D | i | m | # | # | u | t | i | v | e |
|---|---|---|---|---|---|---|---|---|---|---|
| Candidate word | D | i | m | i | n | u | t | i | v | e |
| Match | 1 | 1 | 1 | 0 | 0 | 1 | 1 | 1 | 1 | 1 |

As can be seen, a pair of placeholders, "#", may be inserted into the inputted word as to generate a match greater that the threshold "$TH_2$".

Figure 12:
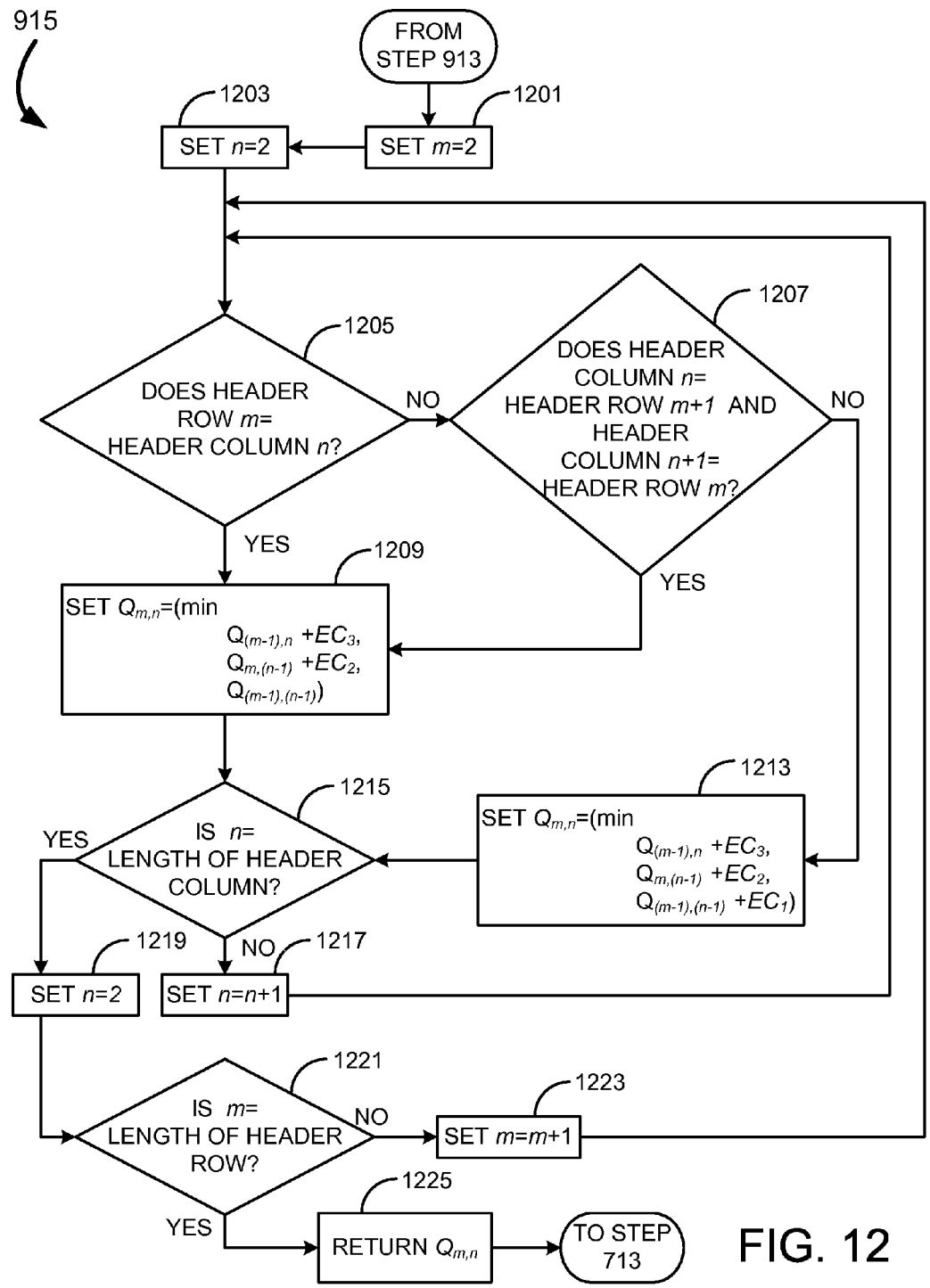
FIG. 12 shows a flow chart illustrating a process of cell comparison in accordance with an embodiment of the present invention.

FIG. 12 shows a flow chart illustrating a process of cell comparison, step 915 of FIG. 9. The process begins from step 913 of FIG. 9. The process then proceeds to step 1201 where "m" is set equal to 2. Then in step 1203 "n" is set equal to 2. The variables "m" and "n" describe the locations of an m-by-n matrix of the comparison grid. The process then proceeds to step 1205 where an inquiry is made as to whether the character found in header of row "m" match the character found in column "n" header. If there is a match, the process then proceeds to step 1209 where the value of the cell intersected by row "m" and column "n", also known as $Q_{m,n}$, is set according to the below Equation 1:

$$Q_{m,n} = \min(Q_{(m-1),n} + EC_3, Q_{m,(n-1)} + EC_2, Q_{(m-1),(n-1)}) \quad \text{Equation 1}$$

The term $Q_{(m-1),n} + EC_3$ constitutes the deletion cost, the term $Q_{m,(n-1)} + EC_2$ constitutes the addition cost, and the term $Q_{(m-1),(n-1)}$ constitutes the replacement cost. The process then proceeds to step 1215.

Otherwise, if at step 1205 the character found in header of row "m" does not match the character found in column "n" header, the process then proceeds to step 1207 where an inquiry is made as to whether the character found in header of row "m" matches the character found in column "n+1" header and the character found in header of row "m+1" matches the character found in column "n" header. This would occur when the User 101 inputs a word with two letters reversed. If this is the case the process then proceeds to step 1209 where the value $Q_{m,n}$, is set equal to the minimum of $Q_{(m-1),n} + EC_3$, $Q_{m,(n-1)} + EC_2$, and $Q_{(m-1),(n-1)}$ as in Equation 1. The process then proceeds to step 1215.

Else, if at step 1207 either the character found in header of row "m" does not match the character found in column "n+1" header, or the character found in header of row "m+1" does not match the character found in column "n" header, the process then proceeds to step 1213 where the value $Q_{m,n}$, is set according to the below Equation 2:

$$Q_{m,n} = \min(Q_{(m-1),n} + EC_3, Q_{m,(n-1)} + EC_2, Q_{(m-1),(n-1)} + EC_1) \quad \text{Equation 2}$$

The term $Q_{(m-1),n} + EC_3$ constitutes the deletion cost, the term $Q_{m,(n-1)} + EC_2$ constitutes the addition cost, and the term $Q_{(m-1),(n-1)} + EC_1$ constitutes the replacement cost. The process then proceeds to step 1215. In some embodiments, the variables "$EC_1$", "$EC_2$" and "$EC_3$" as utilized in FIG. 12 are those generated at FIG. 8.

At step 1215 an inquiry is made as to whether the value of "n" is equal to the length of the column header. If "n" is less than the length of the column header the process then proceeds to step 1217 where 1 is added to the value of "n". The process then returns to step 1205. As such each cell along a row is analyzed in order.

Else, if at step 1215 the value of "n" is equal to the length of the column header, the process then proceeds to 1219 where the value of "n" is reset to 2. The process then proceeds to step 1221 where an inquiry is made as to whether the value of "m" is equal to the length of the row header. If "m" is less than the length of the row header the process then proceeds to step 1223 where 1 is added to the value of "m". The process then returns to step 1205. As such each row is analyzed in order, with each cell within the rows analyzed in order.

Otherwise, if the value of "m" is equal to the length of the row header, the process then proceeds to 1225 where the value of $Q_{m,n}$ is returned. At this stage $Q_{m,n}$ is the bottom rightmost cell on the comparison grid, and is a major component to the editing distance value of the candidate. The process then ends by proceeding to step 713 of FIG. 7.

Figure 13:
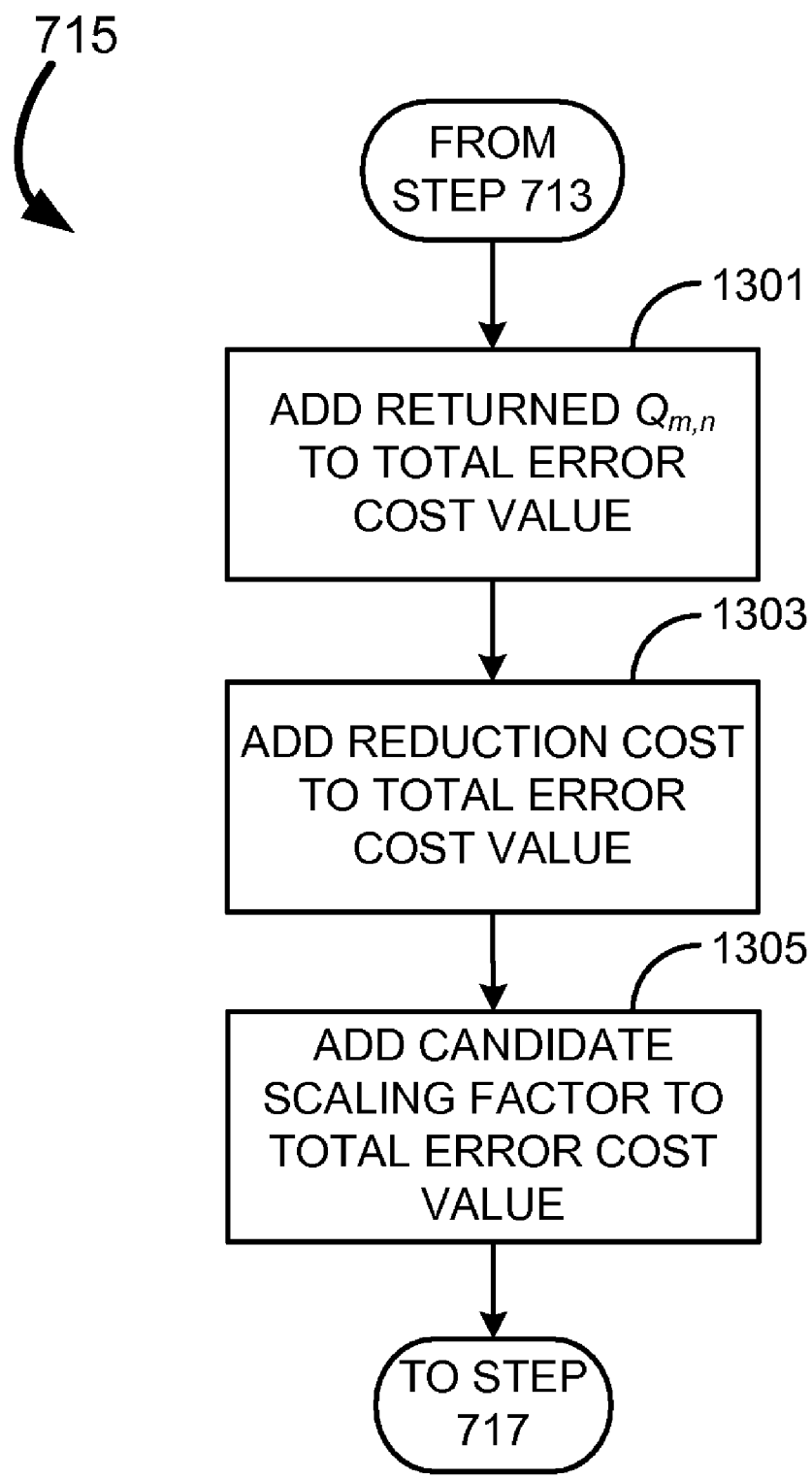
FIG. 13 shows a flow chart illustrating a process of candidate string cost value in accordance with an embodiment of the present invention.

FIG. 13 shows a flow chart illustrating a process of candidate string cost value, step 715 of FIG. 7. The process begins from step 713 of FIG. 7. The process then proceeds to step 1301 where the returned $Q_{m,n}$, as generated at 1225 of FIG. 12, is added to the cost value of the candidate. As previously mentioned, cost value, editing distance and level of attenuation may be used interchangeably, and are intended to be synonymous.

Then, at step 1303 reduction costs, if applicable, may be added to the cost value. The process then proceeds to step 1305 where a scaling factor may be added to the candidate cost value. In some embodiments, the scaling factor may either reduce or increase the cost value. Such a scaling factor may, in some embodiments, be related to the probability that the candidate is misspelled, with more "difficult" words having their cost value reduced, while "easier" words have their cost value increased. The process then ends by progressing to step 717 of FIG. 7.

C. Real-Word Error Correction

Figure 14:
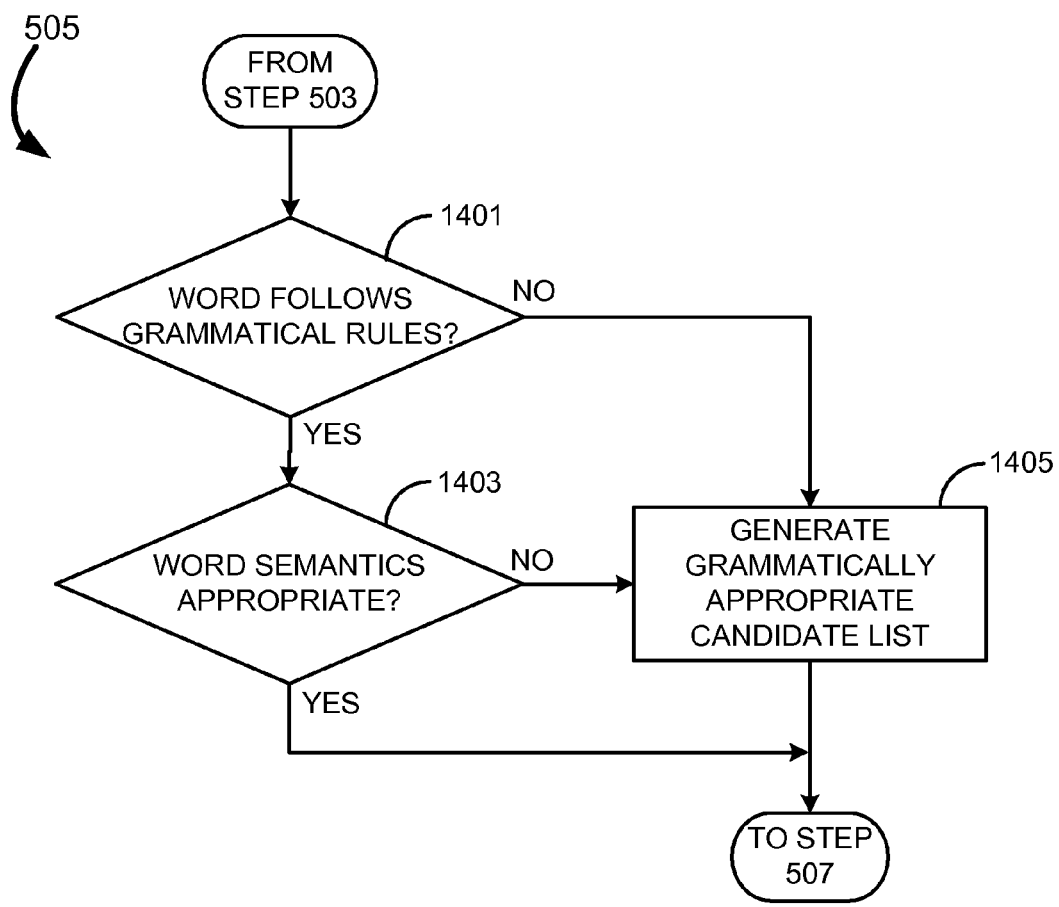
FIG. 14 shows a flow chart illustrating a process of real word errors in accordance with an embodiment of the present invention.

FIG. 14 shows a flow chart illustrating a process of correcting real word errors, step 505 of FIG. 5. The process begins from step 713 of FIG. 7. The process then proceeds to step 1401 where an inquiry is made as to whether the words follow grammatical rules. If grammatical rules are followed, the process then proceeds to step 1403 where an inquiry is made as to whether the words are syntactically appropriate. If the words are syntactically appropriate then the process ends by progressing to step 507 of FIG. 5.

Else, if the words do not follow grammatical rules, nor make syntactical sense, the process then proceeds to step 1405 where a candidate list of words is generated. Then the process ends by progressing to step 507 of FIG. 5.

Figure 15:
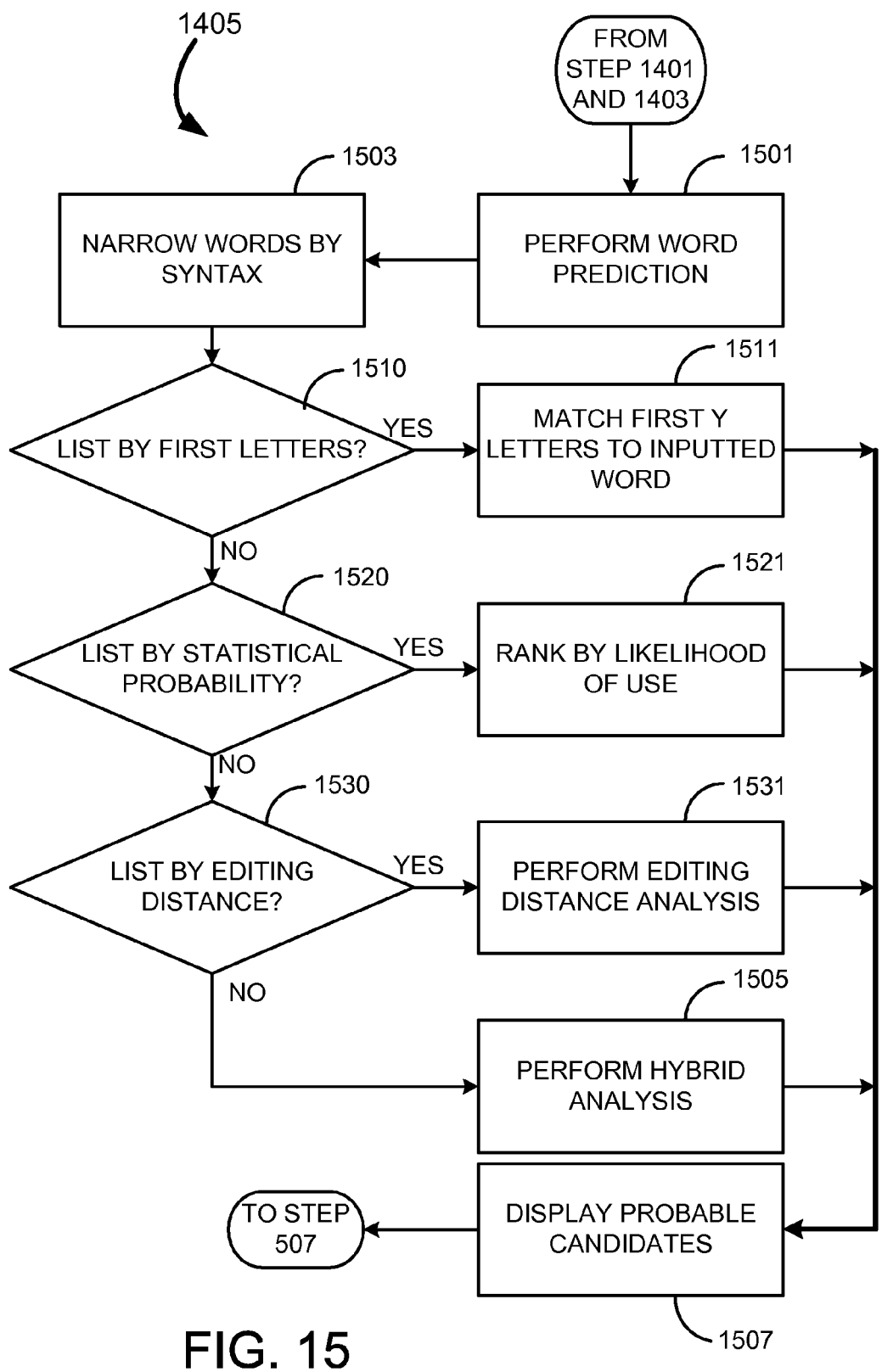
FIG. 15 shows a flow chart illustrating a process of candidate list generation in accordance with an embodiment of the present invention.

FIG. 15 shows a flow chart illustrating a process of candidate list generation, step 1405 of FIG. 14. The process begins from step 1401 or 1403 of FIG. 14. The process then proceeds to step 1501 where word prediction is performed. Then, at step 1503, words may be narrowed by their syntax. Thus only words that would make sense in the context will be considered for display to the User 101.

Then, at step 1510, an inquiry is made whether to rank the narrowed word list by first letters. If ranking by first letters is desired, then the words may be ranked by the first "CC" letter matches to the inputted word, at step 1511. "CC" may be User 101 defined or predetermined. The rational behind first letter matching is that people tend to know the beginning letters and sounds of desired words. Accuracy of spelling and recall diminished the further into the word one progresses. Thus, a User 101 may be likely to type "begin" instead of "benign". The process then proceeds to step 1507 where the results of the ranking are displayed. The process then ends by progressing to step 507 of FIG. 5.

Else, if ranking by first letters is not desired, at step 1510, then an inquiry is made whether to rank the narrowed word list by probability at step 1520. If ranking by probability is desired the process then proceeds to step 1521 where the narrowed word list is ranked by each candidate word's probability of following the previous one or more word(s). The process then proceeds to step 1507 where the results of the ranking are displayed. The process then ends by progressing to step 507 of FIG. 5.

Else, if ranking by probability is not desired at step 1520, then an inquiry is made whether to rank the narrowed word list by editing distance at step 1530. If ranking by editing distance is desired the process then proceeds to step 1531 where the narrowed word list is ranked by each candidate word's editing distance to the inputted word. This editing distance analysis may, in some embodiments, closely parallel the editing distance method disclosed in FIGS. 6 through 13 and associated text. An editing distance ranking may be of particular use when the User 101 misspelled the intended word, and mistakenly spelled another real word by coincidence. The process then proceeds to step 1507 where the results of the ranking are displayed. The process then ends by progressing to step 507 of FIG. 5.

Otherwise, if ranking by editing distance is not desired at step 1530, then a hybrid system may be utilized at step 1505. In some embodiments, a hybrid system may perform some or all of the above methods of ranking the candidate word list and then synthesizing the results of each into a final list. The process then proceeds to step 1507 where the results of the ranking are displayed. The process then ends by progressing to step 507 of FIG. 5.

IV. Examples

Figure 16:
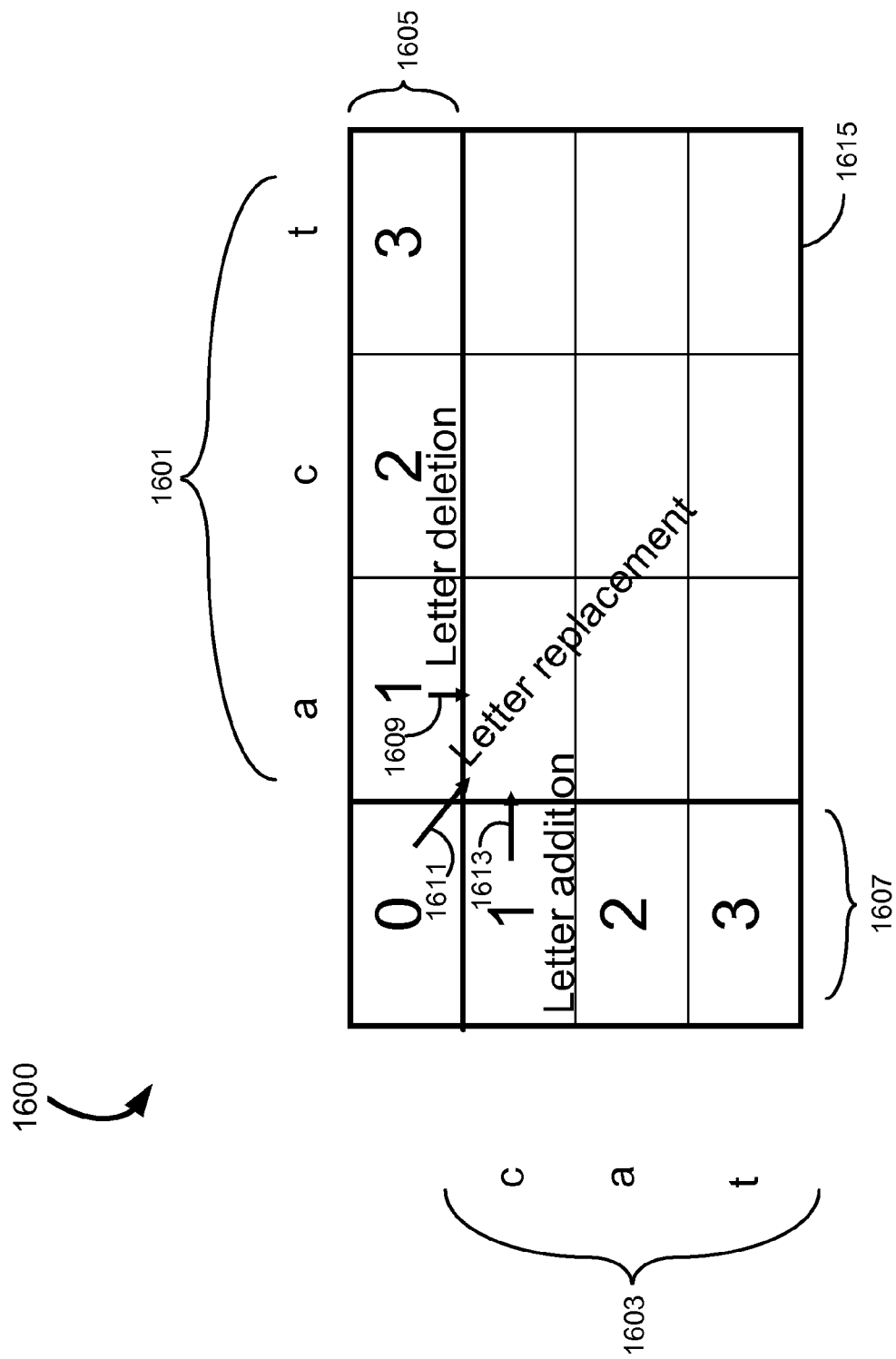
FIG. 16 shows an illustration of a grid comparison setup in accordance with an embodiment of the present invention.

FIG. 16 shows an illustration of an exemplary grid comparison setup, shown generally at 1600. A Grid 1615 is shown. The two words being compared "act" and "cat" are placed within the Column Header 1601 and Row Header 1603, respectively. The First Row 1605 of the Grid 1600 has numbers, increasing in magnitude, placed within each cell, beginning from zero. Likewise, the First Column 1607 of the Grid 1600 has numbers, increasing in magnitude, placed within each cell, beginning from zero. In the present example the numbers are all whole integers. Each empty cell is calculated by taking the minimum value of the cell to the top, left and top-left diagonal, plus a modifier. Those modifiers are the replacement "EC1" cost, addition "EC2" cost and deletion "EC3" cost of FIG. 8. It may also be seen which direction Letter Addition 1609 cost, Letter Replacement 1611 cost, and Letter Deletion 1613 cost are from.

Figure 17:
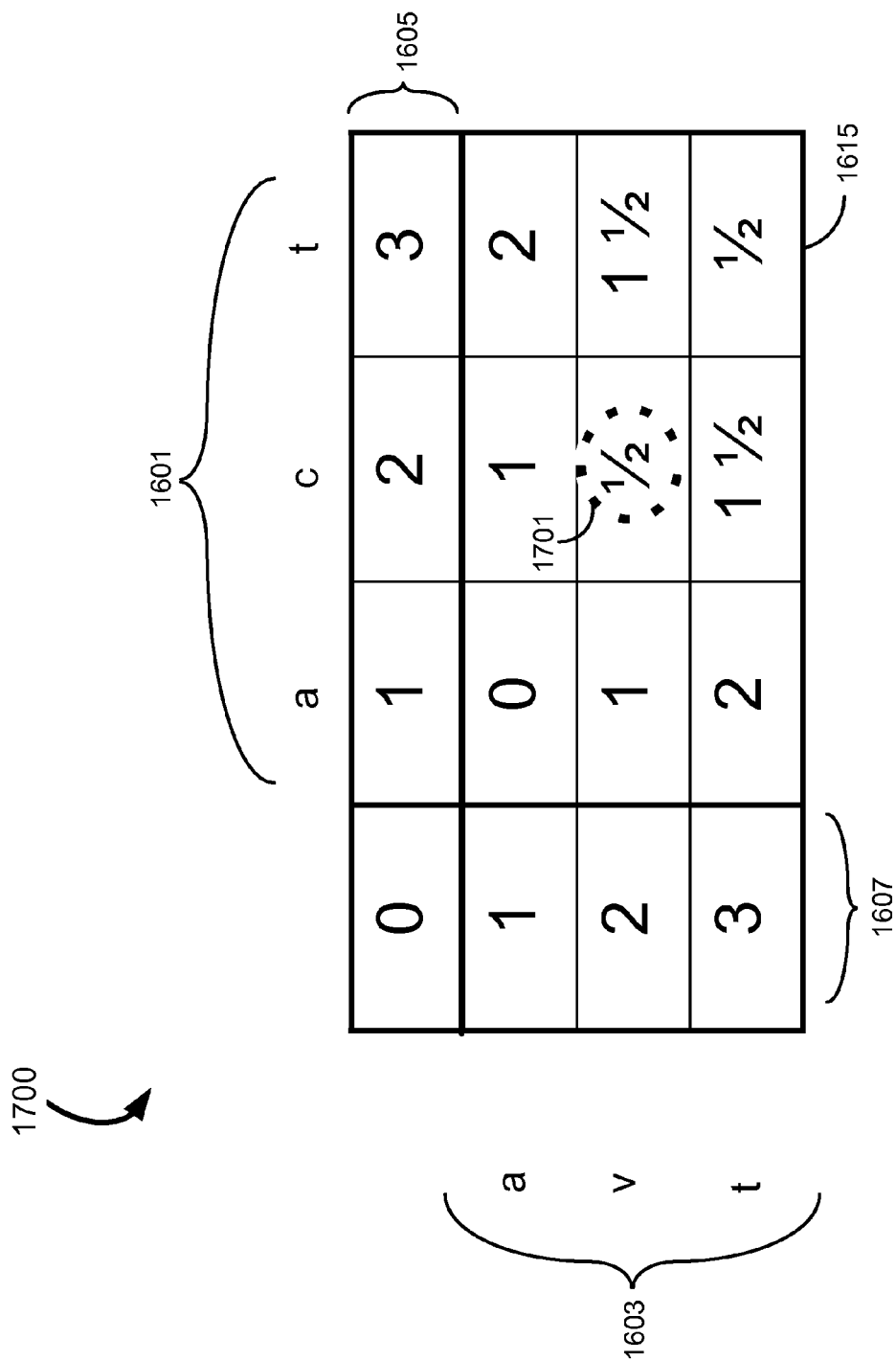
FIG. 17 shows an illustration of a completed grid comparison in accordance with an embodiment of the present invention.

FIG. 17 shows an illustration of an exemplary completed grid comparison, shown generally at 1700. Again the Grid 1615, Column Header 1601 and Row Header 1603, and First Row 1605 and First Column 1607 may be seen. The comparative words in this example are "act" and "avt". Here, the substituted letter, "v" and "c" are adjacent on a deterministic keyboard. Thus, limited to this example, the substitution cost of "v" from "c" is set at one-half, and all other additions, replacements or deletions are set to a cost value of 1. In other words, EC1=0.5, EC3=1 and EC2=1. It should be clear that the same effect may be achieved using only integer values by using the coefficients of 1, 2 and 2 in this example precluding any apparent need for fractional arithmetic.

For calculation of the grid, the header of column 2 and row 2 are compared. They match, thus $Q_{2,2}$ is equal to the minimum of $Q_{1,2}+1$, $Q_{2,1}+1$, and $Q_{1,1}$. Since $Q_{1,1}$ is 0, $Q_{2,2}$ is 0.

A similar analysis follows for all other cells in the Grid 1600. However, at $Q_{3,3}$ 1701 the cell value is equal to the minimum of $Q_{2,3}+1$, $Q_{3,2}+1$, and $Q_{2,2}+0.5$. Since $Q_{2,2}$ we found to be 0, $Q_{3,3}$ 1701 is ½.

Figure 18:
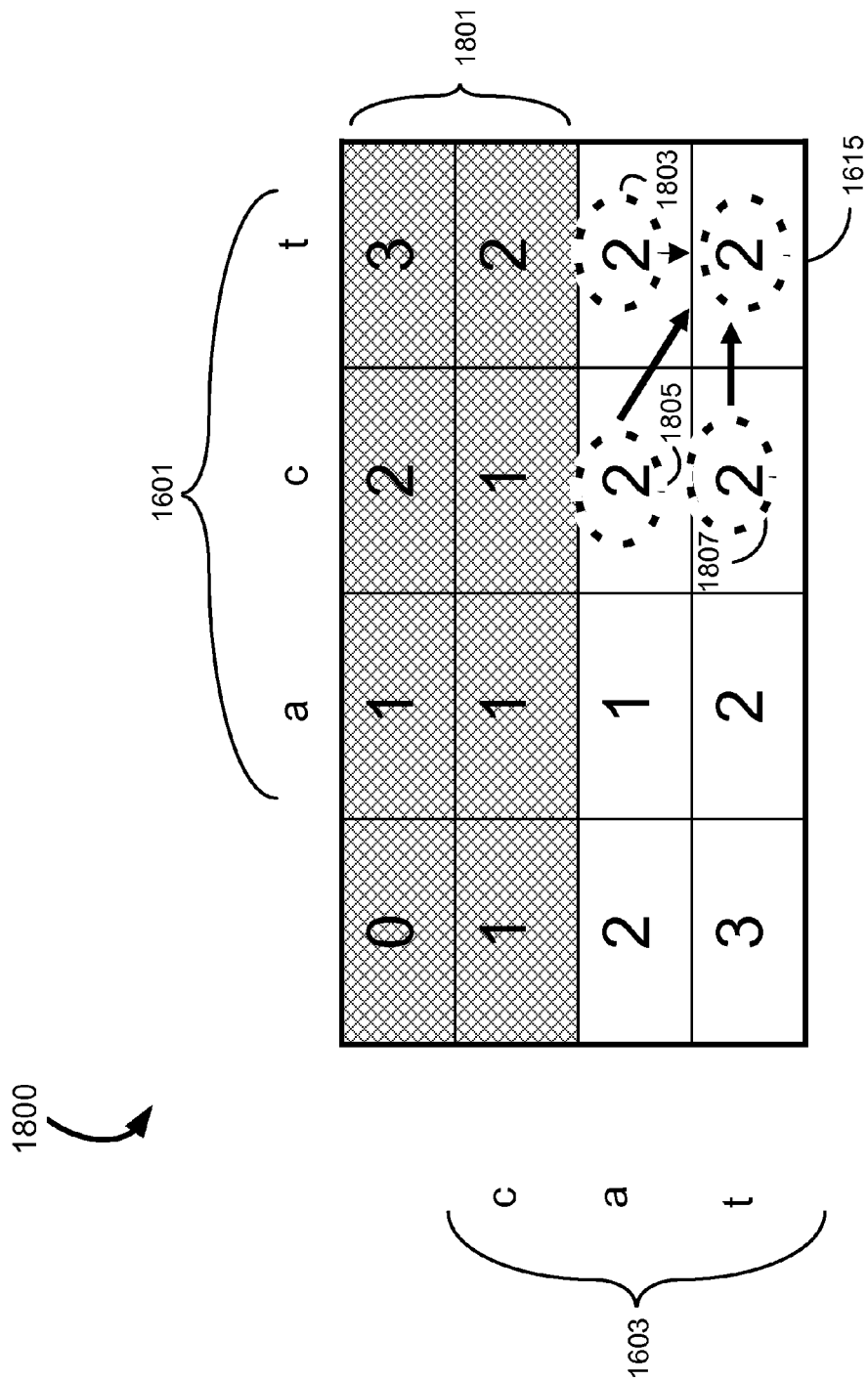
FIG. 18 shows an illustration of a grid comparison with memory reduction in accordance with an embodiment of the present invention.

FIG. 18 shows an illustration of an exemplary grid comparison with memory reduction, shown generally at 1800. Like FIGS. 16 and 17, this example includes a three letter square matrix. For this example all costs are a value of 1. The total editing distance is found from the minimum of the addition cost, substitution cost and deletion cost, 1803, 1805 and 1807, respectively. Of note, is that in determining the final editing distance for cell $Q_{4,4}$ the Shaded Regions 1801 of the Grid 1600 are not required. Thus, data from these portions of the grid analysis may be purged from memory. As previously noted, solving of any grid is performed one row at a time, from left to right across the row. Additionally, the comparative words were positioned so that the shorter of the two words would be in the column header. As such, no more that the data of 2 times the shortest comparative word length plus one [2×(L+1)] cells is required to be stored at any one time. This considerably reduces the memory demands upon the device running the Text Correction System 100, especially when comparing lengthy words. It should also be noted that very long words tend to achieve a uniqueness well before the entire word has been entered and spelling errors can be disposed of without substantial computation by simple substitution with no alternative possibility.

Figure 19:
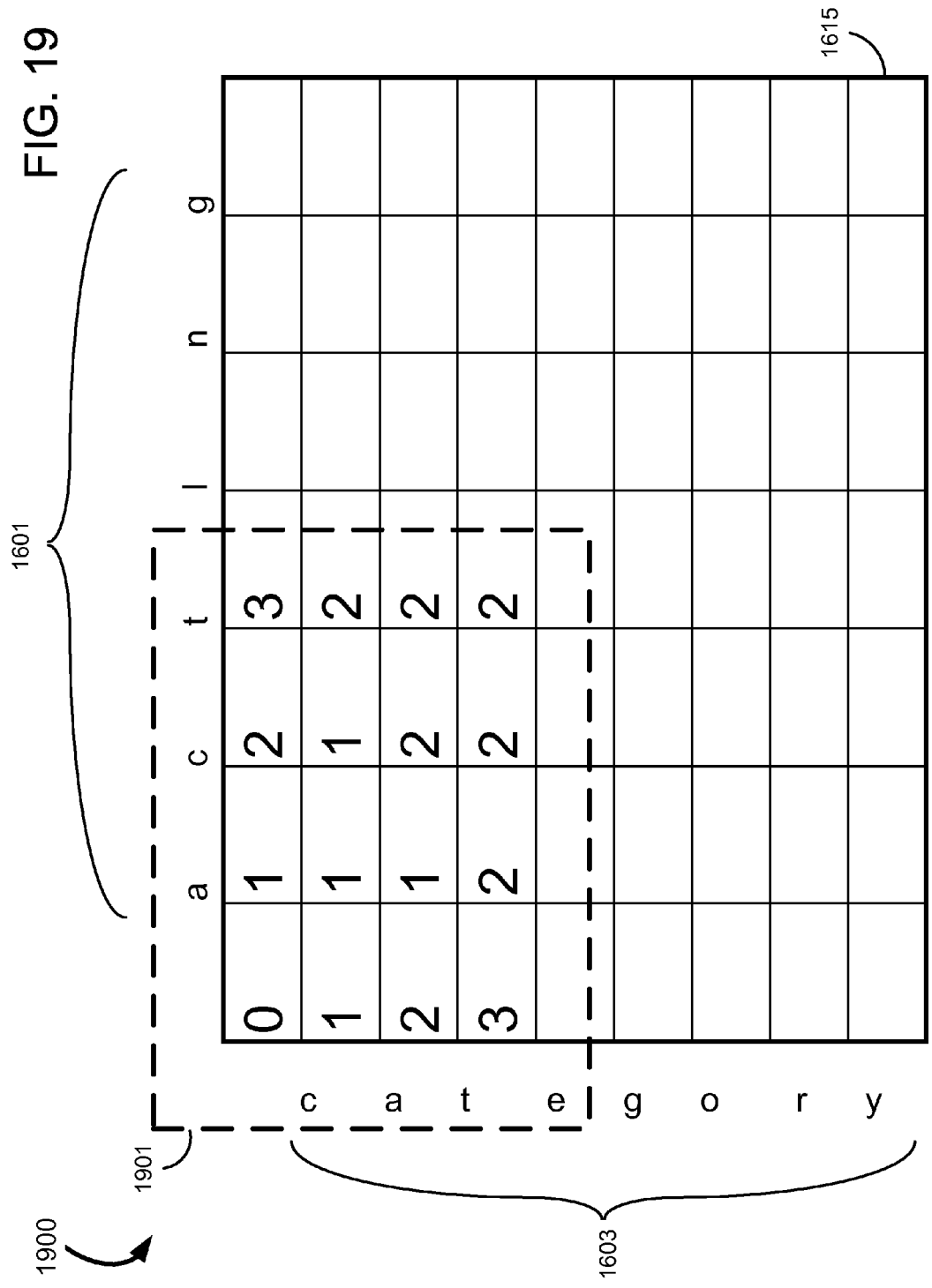
FIG. 19 shows an illustration of a grid comparison shortcut for processor reduction in accordance with an embodiment of the present invention.

FIG. 19 shows an illustration of an exemplary grid comparison shortcut for processor reduction, shown generally at 1900. Again the Grid 1615 may be seen with header words: "acting" and "category" in the present example. The "act" in "acting" is a substring of its Directed Acyclic Word Graph (DAWG). Likewise, the "cat" in "category" is a substring in that particular DAWG. Previously, the editing distance calculation for "act" and "cat" was performed. The present invention, as previously discussed, is capable of inputting this editing distance analysis directly into the current grid comparison, as seen at 1901. The advantage of importing the editing distance in this way is, again, a marked reduction in processing resource demand.

Figure 20:
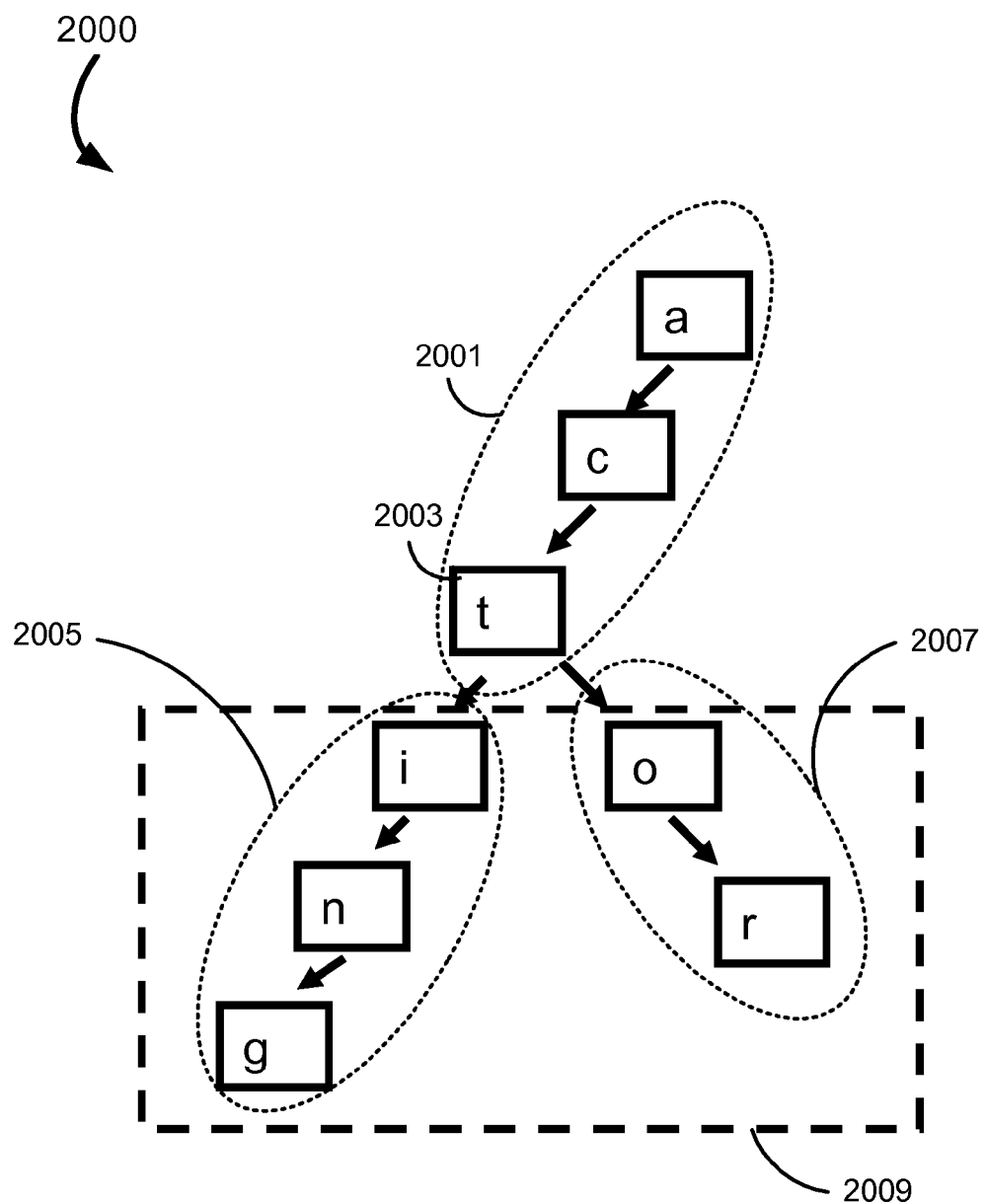
FIG. 20 shows an illustration of a directed acyclic word graph for use in error correction in accordance with an embodiment of the present invention.

FIG. 20 shows an illustration of an exemplary Directed Acyclic Word Graph (DAWG) for use in error correction, shown generally at 2000. The Shared Prefix "act" 2001 may be seen at the top as a substring. The Node 2003 is one point of divergence between separate substrings. Divergent Substrings 2009 include "ing" 2005 and "or" 2007 which complete the words "acting" and "actor" respectively.

In sum the present invention relates generally to text error correction system and method to provide fast, accurate and resource efficient analysis of text errors. Additionally, the text error correction may compensate for many of the problems faced by text authors who are using mobile devices with inputs that are error prone. In this way the text correction system and method may provide an invaluable tool for device manufacturers and device users.

While this invention has been described in terms of several preferred embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computer implemented method for text error correction, useful in association with a personal appliance, the method for text error correction comprising the steps of:
    inputting a word, wherein the inputted word includes a string of characters;
    generating at least two candidate words by selecting the at least two candidate words from a corpus by fuzzy logic, wherein the at least two candidate words are similar to the received inputted word, and wherein the at least two candidate words includes a string of characters;
    generating variable error costs, wherein the variable error costs are determined by probability of erroneously inputting any given character of the inputted word;
    calculating an editing distance for each of the at least two candidate words by using the variable error costs, wherein the editing distance is the degree of attenuation between the candidate word and the inputted word; and
    selecting a preferred candidate word from the at least two candidate words by using the editing distance, wherein the preferred candidate word has the smallest editing distance of all the editing distances of the at least two candidate words.

2. The method of text error correction of claim 1, wherein the inputted string of characters is generated by a user.

3. The method of text error correction of claim 2, wherein the step of selecting the at least two candidate words from the corpus by fuzzy logic utilizes user preferences, and wherein the user preferences are generated from past user behavior.

4. The method of text error correction of claim 1, wherein the variable error costs includes replacement error costs, addition error costs and deletion error costs.

5. The method of text error correction of claim 1, wherein the preferred candidate includes more than one candidate of the at least two candidate words, and wherein each of the more than one candidate of the preferred candidate has an editing distance below a threshold value.

6. The method of text error correction of claim 1, wherein the step of calculating the editing distance for each of the at least two candidate words includes a grid comparison between each candidate word of the at least two candidate words and the inputted string of characters.

7. The method of text error correction of claim 6, wherein each of the editing distances is stored.

8. The method of text error correction of claim 7, wherein the step of calculating each of the editing distances queries previously stored editing distances for a partial match, and when the partial match is found inputting the stored editing distance into the grid comparison.

9. A computer implemented method for text error correction, useful in association with a personal appliance, comprising the steps of:
    inputting a word, wherein the inputted word includes a string of characters;
    generating at least two candidate words, wherein the at least two candidate words are similar to the received inputted words, and wherein the at least two candidate words includes a string of characters;
    generating variable error costs, wherein the variable error costs are determined by probability of erroneously inputting any given character of the inputted word;
    calculating an editing distance for each of the at least two candidate words by using the variable error costs, wherein the editing distance is the degree of attenuation between the candidate word and the inputted word, and includes a grid comparison between each candidate word of the at least two candidate words and the string of characters, wherein the grid comparison calculates cell values along grid rows, and wherein values of cells within a row M are purged from memory after all cells in the row M+1 have been calculated; and
    selecting a preferred candidate word from the at least two candidate words by using the editing distance, wherein the preferred candidate word has the smallest editing distance of all the editing distances of the at least two candidate words.

10. A text error corrector, useful in association with a mobile device, the text error corrector comprising:
    an interface configured to input a string of characters;
    a word prediction engine configured to generate at least two word candidates, wherein the word prediction engine selects the at least two word candidates from a corpus by fuzzy logic, wherein the least two word candidates are similar to the inputted character string, and wherein the at least two word candidates includes a string of characters;
  a statistical engine configured to generate variable error costs, wherein the variable error costs are determined by probability of erroneously inputting any given character of the string of characters;
  an editing distance calculator configured to calculate an editing distance for each of the at least two word candidates using the generated variable error costs, wherein the editing distance is the degree of attenuation between the word candidate and the inputted character string; and
  a selector configured to select a preferred candidate from the at least two word candidates using the editing distance, wherein the preferred candidate has the smallest editing distance of all the editing distances of the at least two word candidates.

11. The text error corrector of claim 10, wherein the interface receives the string of characters from a user.

12. The text error corrector of claim 11, wherein the word prediction engine utilizes user preferences for selecting the at least two word candidates from the corpus by fuzzy logic, and wherein the user preferences are generated from past user behavior.

13. The text error corrector of claim 10, wherein the statistical engine generates variable error costs which include replacement error costs, addition error costs and deletion error costs.

14. The text error corrector of claim 10, wherein the selector selects more than one candidate of the at least two word candidates as the preferred candidate, and wherein each of the more than one candidate of the preferred candidate has an editing distance below a threshold value.

15. The text error corrector of claim 10, wherein the editing distance calculator utilizes a grid comparison between each word candidate of the at least two word candidates and the inputted string of characters to calculate the editing distance for each of the at least two word candidates.

16. The text error corrector of claim 15, further comprising a database configured to store each of the editing distances.

17. The text error corrector of claim 16, wherein the editing distance calculator queries the database for previously stored editing distances for a partial match to editing distance calculation, and when the partial match is found inputting the stored editing distance into the grid comparison.

18. A text error corrector, useful in association with a mobile device, the text error corrector comprising:
  an interface configured to input a string of characters;
  a word prediction engine configured to generate at least two word candidates, wherein the least two word candidates are similar to the inputted character string, and wherein the at least two word candidates includes a string of characters;
  a statistical engine configured to generate variable error costs, wherein the variable error costs are determined by probability of erroneously inputting any given character of the string of characters;
  an editing distance calculator configured to calculate an editing distance for each of the at least two word candidates using the generated variable error costs, wherein the editing distance calculator utilizes a grid comparison between each word candidate of the at least two word candidates and the inputted string of characters to calculate the editing distance for each of the at least two word candidates, wherein the editing distance is the degree of attenuation between the word candidate and the inputted character string, wherein the editing distance calculator calculates cell values along grid rows during the grid comparison, and wherein values of cells within a row M are purged from memory after all cells in the row M+1 have been calculated; and
  a selector configured to select a preferred candidate from the at least two word candidates using the editing distance, wherein the preferred candidate has the smallest editing distance of all the editing distances of the at least two word candidates.

* * * * *